US007440907B2

(12) United States Patent
Lilly et al.

(10) Patent No.: US 7,440,907 B2
(45) Date of Patent: Oct. 21, 2008

(54) SYSTEM AND METHOD FOR THROUGHPUT MEASUREMENT

(75) Inventors: Michael P. Lilly, Candia, NH (US); Richard T. Lilly, North Hampton, NH (US); Frank G. Maglio, Atkinson, NH (US); Mark A. Longmire, Dover, NH (US); Bruce W. Barker, Stratham, NH (US)

(73) Assignees: Infor Global Solutions (Michigan), Inc., Bingham Farms, MI (US); Profuse Group B.V. (NL)

( * ) Notice: Subject to any disclaimer, the term of this patent is extended or adjusted under 35 U.S.C. 154(b) by 140 days.

(21) Appl. No.: 11/401,932

(22) Filed: Apr. 12, 2006

(65) Prior Publication Data

US 2006/0253312 A1  Nov. 9, 2006

Related U.S. Application Data

(62) Division of application No. 09/421,834, filed on Oct. 20, 1999, now Pat. No. 7,039,595.

(60) Provisional application No. 60/105,129, filed on Oct. 21, 1998.

(51) Int. Cl.
*G06F 9/46* (2006.01)
(52) U.S. Cl. .......................................................... 705/8
(58) Field of Classification Search .................. 705/8
See application file for complete search history.

(56) References Cited

U.S. PATENT DOCUMENTS 3,705,410 A  12/1972  Kooy et al.

| | | |
|---|---|---|
| 4,218,616 A | 8/1980 | Loomer |
| 4,336,589 A | 6/1982 | Smith et al. |
| 4,340,810 A | 7/1982 | Glass |
| 4,459,663 A | 7/1984 | Dye |
| 4,509,123 A | 4/1985 | Vereen |
| 4,588,881 A | 5/1986 | Pejas et al. |
| 4,621,325 A | 11/1986 | Naftzger et al. |
| 4,646,238 A | 2/1987 | Carlson, Jr. et al. |
| 4,697,753 A | 10/1987 | Schippers et al. |

(Continued)

FOREIGN PATENT DOCUMENTS

WO  WO 97/13211  4/1997

OTHER PUBLICATIONS

Wesley "Task response time for real-time distributed systems with resource contentions. (includes appendices of time response estimation, state transition rates and module response time varian", Oct. 1991, Transactions on Software Engineering, v17, n10, p. 1076(17; Dialog file 275, Accession No. 01412318).*

(Continued)

*Primary Examiner*—Romain Jeanty
(74) *Attorney, Agent, or Firm*—Blank Rome LLP

(57) ABSTRACT

A computerized method for determining throughput includes generating a demand array of item orders and generating a supply array of manufacturing inventory. The method includes selecting an item order in the demand array, and matching manufacturing inventory in the supply array with the selected item order. The method also includes assigning a throughput value to the selected item order based on the matched manufacturing inventory.

18 Claims, 29 Drawing Sheets

U.S. PATENT DOCUMENTS

| | | | |
|---|---|---|---|
| 4,783,740 A | 11/1988 | Ishizawa et al. | |
| 4,937,743 A | 6/1990 | Rassman et al. | |
| 5,038,283 A | 8/1991 | Caveney | |
| 5,089,970 A | 2/1992 | Lee et al. | |
| 5,093,794 A | 3/1992 | Howie et al. | |
| 5,101,352 A | 3/1992 | Rembert | |
| 5,136,497 A | 8/1992 | Coe et al. | |
| 5,172,313 A | 12/1992 | Schumacher | |
| 5,193,065 A | 3/1993 | Guerindon et al. | |
| 5,202,837 A | 4/1993 | Coe et al. | |
| 5,216,593 A | 6/1993 | Dietrich et al. | |
| 5,231,567 A | 7/1993 | Matoba et al. | |
| 5,233,533 A | 8/1993 | Edstrom et al. | |
| 5,237,495 A | 8/1993 | Morii | |
| 5,237,496 A | 8/1993 | Kagami et al. | |
| 5,283,745 A | 2/1994 | Tanaka | |
| 5,291,397 A | 3/1994 | Powell | |
| 5,303,144 A | 4/1994 | Kawashima et al. | |
| 5,325,304 A | 6/1994 | Aoki | |
| 5,334,822 A | 8/1994 | Sanford | |
| 5,369,570 A * | 11/1994 | Parad | 705/8 |
| 5,395,206 A | 3/1995 | Cerny, Jr. | |
| 5,403,147 A | 4/1995 | Tanaka | |
| 5,430,831 A | 7/1995 | Snellen | |
| 5,440,480 A | 8/1995 | Costanza | |
| 5,450,317 A | 9/1995 | Lu et al. | |
| 5,463,555 A | 10/1995 | Ward et al. | |
| 5,479,343 A | 12/1995 | Matoba et al. | |
| 5,485,369 A | 1/1996 | Nicholls et al. | |
| 5,487,143 A | 1/1996 | Southgate | |
| 5,548,518 A | 8/1996 | Dietrich et al. | |
| 5,568,393 A | 10/1996 | Ando et al. | |
| 5,570,291 A | 10/1996 | Dudle et al. | |
| 5,586,021 A | 12/1996 | Fargher et al. | |
| 5,596,502 A | 1/1997 | Koski et al. | |
| 5,600,565 A | 2/1997 | Wagner et al. | |
| 5,615,109 A | 3/1997 | Eder | |
| 5,630,070 A | 5/1997 | Dietrich et al. | |
| 5,712,989 A | 1/1998 | Johnson et al. | |
| 5,787,000 A | 7/1998 | Lilly et al. | |
| 5,835,898 A | 11/1998 | Borg et al. | |
| 5,966,694 A | 10/1999 | Rothschild et al. | |
| 6,044,354 A | 3/2000 | Asplen, Jr. et al. | |
| 6,144,893 A | 11/2000 | Van Der Vegt et al. | |
| 6,195,590 B1 * | 2/2001 | Powell | 700/36 |
| 6,226,561 B1 | 5/2001 | Tamaki et al. | |
| 6,330,545 B1 | 12/2001 | Suh | |
| 6,524,109 B1 | 2/2003 | Lacy et al. | |

OTHER PUBLICATIONS

Lilly Software Associates, Common Sense Throughput for CEO's, Sep. 18, 1998, Hampton, NH.

Goldratt et al. The Goal, 1984, pp. 60-61, North River Press, Inc. Inc., Great Barrington, MA.

Klusewitz et al. "Constraint Management Through the Drum-Buffer-Rope System," *1996 IEEE/Semi Advanced Semiconductor Manufacturing Conference*, 1996, pp. 7-12.

Kosturiak et al. "Simulation in Production System Life Cycle," *Computer in Industry*, vol. 38, No. 2, Mar. 1999, pp. 159-172.

Patent Cooperation Treaty, International Search Report, International Application No. PCT/US 99/24514, mailed on Feb. 22, 2000, 4 pages.

Robert Bowman. "Strategies for International Shipping," *Distribution*, Oct. 1990, pp. 79-80.

Helen Richardson. "T&D Recognizes Excellence in Logistics," *Transportation & Distribution*, vol. 32, No. 12, Dec. 1991, 5 pages.

Steve Zurier. "Delivering Quality Customer Service: Distributors Striving for Zero Defects Have Found That to Make the Quality Process Work, They Must Involve Every Employee in the Company," *Industrial Distribution*, vol. 78, No. 3, p. 30, Mar. 1989, 4 pages.

Ernest Raja. "JIT Delivery: Redefining On-Time", *Purchasing*, vol. 109, No. 3, p. 64, Sep. 13, 1990, 4 pages.

Mark Miller. "The Key to Recognition is Teamwork—Ironing Out Conflicts Will Yield Positive Results," *Electronic Buyers' News*, 1993, No. 865, Aug. 2, 1993, 2 pages.

Mark Miller. "Don't Let Undependable Supplier Bug You—Five Principles to Help Boost the Rate of On-Time Deliveries," *Electronic Buyers' News*, 1993, No. 839, Feb. 1, 1993, 2 pages.

Potvin et al. "A Parallel Route Building Algorithm for the Vehicle Routing and Scheduling Problem with Time Windows," *Centre de recherché sur les transports—Publication #729*, Oct. 1990, Revised Jul. 1991—Apr. 1993, Montreal, 1-18.

* cited by examiner

SOFT ALLOCATIONS DATA TABLE

| COLUMN | TYPE | SIZE | SCALE | DESCRIPTION |
| --- | --- | --- | --- | --- |
| CUST_ORDER_ID | CHAR | 15 | | ID OF CUSTOMER ORDER |
| CUST_ORDER_LINE_NO | SMALLINT | | | CUSTOMER ORDER LINE NUMBER |
| PART_ID | VARCHAR | 30 | | PART ID, MIGHT BE NULL (LINKED COLI ONLY) |
| WO_BASE_ID | VARCHAR | 30 | | WORK ORDER ID, MIGHT BE NULL (INDICATING INVENTORY AS SUPPLY SOURCE) |
| WO_LOT_ID | VARCHAR | 3 | | WORK ORDER LOT ID, MIGHT BE NULL (INDICATING INVENTORY AS SUPPLY SOURCE) |
| WO_SPLIT_ID | VARCHAR | 3 | | WORK ORDER SPLIT ID, MIGHT BE NULL (INDICATING INVENTORY AS SUPPLY SOURCE) |
| SUPPLY_DATE | TIMESTAMP | 10 | | DATE OF SUPPLY |
| QUANTITY | DECIMAL | 14 | 4 | QUANTITY ALLOCATED TO THIS CUSTOMER ORD LINE ITEM FROM THIS SOURCE |

| Customer Order | Customer Name | Packer ID | Line No. | Part ID | Date Shipped | Quantity Shipped | Sales Amount | Material Cost | Labor/Loss | Throughput Amount |
|---|---|---|---|---|---|---|---|---|---|---|
| PLATE 1 | Miller Machine Co. | 00078 | 1 | PLATE | 3/24/98 | 1 | $5,000.00 | $0.00 | $0.00 | $5,000.00 |
| | | | | | | | $5,000.00 | $0.00 | $0.00 | $5,000.00 |

Actual Throughput Inquiry Detail - [STANDARD  3/1/98-3/31/98]

Sales: $5,000.00  Material: $0.00  Labor: $0.00  Throughput: $5,000.00

| SCREEN LABEL | DESCRIPTION |
|---|---|
| CUSTOMER ORDER | THE CUSTOMER ORDER ID ( CUSTOMER_ORDER.ID ). |
| CUSTOMER NAME | THE CUSTOMER NAME ( CUSTOMER_ORDER.NAME ). |
| PACKLIST ID | THE PACKLIST ID ( SHIPPER.PACKLIST_ID ). |
| LINE NO | THE CUSTOMER ORDER LINE NUMBER. |
| PART ID | THE PART ID FROM THE CUSTOMER ORDER LINE ( CUST_ORDER_LINE.PART_ID ). |
| DATE SHIPPED | THE LAST SHIP DATE FROM THE CUSTOMER ORDER LINE (CUST_ORDER_LINE.LAST_DATE_SHIPPED). |
| QUANTITY SHIPPED | THE TOTAL QUANTITY SHIPPED ON THE CUSTOMER ORDER LINE ( CUST_ORDER_LINE.TOTAL_AMT_SHIPPED ). |
| SALES AMOUNT | ALLOCATED QUANTITY MULTIPLIED BY THE UNIT PRICE, LESS DISCOUNTS AND COMMISSIONS. |
| MATERIAL COST | FROM WORK ORDER OR INVENTORY MULTIPLIED BY QUANTITY ALLOCATED. |
| SERVICE COST | FROM WORK ORDER OR INVENTORY MULTIPLIED BY QUANTITY ALLOCATED. |
| THROUGHPUT AMOUNT | SALES AMOUNT LESS MATERIAL COST AND SERVICE COST. |

Expected Throughput Inquiry Detail - [STANDARD 10/1/98-10/31/98]

| Customer Order | Customer Name | Part ID | Need Date | Need Qty | Work Order Act Finish Date | Work Order ID | Sales Amount | Material Cost | Service Cost | Throughput Amount |
|---|---|---|---|---|---|---|---|---|---|---|
| CUST OR | ARC Wel | PLATE | 12/18/96 | 444 | 10/5/98 | SKIP/1 | $13,320.00 | $0.00 | $0.00 | $13,320.00 |
| CUST OR | ARC Wel | PLATE | 12/18/96 | 12 | 10/5/98 | SKIP/1 | $114.00 | $0.00 | $0.00 | $114.00 |
| CUST OR | ARC Wel | PLATE | 12/18/96 | 44 | 10/5/98 | SKIP/1 | $418.00 | $0.00 | $0.00 | $418.00 |
| AT1/1 | HERMAN | 9045500017 | 3/20/97 | 98 | 10/5/98 | JAT1/1 | $0.00 | $0.00 | $0.00 | $0.00 |
| BOYCE/1 | SEPCO | SEPCO | 6/11/97 | 97 | 10/5/98 | 00011/1 | $0.00 | $0.00 | $0.00 | $0.00 |
| BOYCE/2 | SEPCO | SEPCO | 6/11/97 | 3 | 10/5/98 | 00011/1 | $0.00 | $0.00 | $0.00 | $0.00 |
| FIBRO/1 | SEPCO | STEEL-1 | 6/25/97 | 100 | 10/5/98 | FIBRO1/ | $1,200.00 | $2,680.00 | $11,700.00 | ($23,180.00) |
| NICK1/1 | HERMAN | EAT6200 | 5/11/97 | 1 | 10/6/98 | 00007/1 | $12.00 | $0.00 | $0.00 | $12.00 |
| CUST OR | ARC Wel | FAB-PART | 12/23/96 | 24 | 10/22/98 | TEST TF | $0.00 | $24.00 | $24.00 | ($48.00) |
| CAMB AL | CAMB AL | BRACKET | 2/18/97 | 12 | 10/26/98 | 00005/1 | $129.60 | $0.00 | $0.00 | $129.60 |
|  |  |  |  |  |  |  | $15,193.60 | $2,704.00 | $11,724.00 | ($9,234.40) |

FIG. 12

| SCREEN LABEL | DESCRIPTION |
|---|---|
| CUSTOMER ORDER | THE CUSTOMER ORDER ID ( CUSTOMER_ORDER.ID ). |
| CUSTOMER NAME | THE CUSTOMER NAME ( CUSTOMER_ORDER.NAME ). |
| PART ID | THE PART ID FROM THE CUSTOMER ORDER LINE (CUST_ORDER_LINE.PART_ID ). |
| WANT DATE | THE DESIRED WANT DATE FOR THE WORK ORDER. |
| QUANTITY | THE TOTAL QUANTITY SHIPPED ON THE CUSTOMER ORDER LINE ( CUST_ORDER_LINE.TOTAL_AMT_SHIPPED ). |
| WORK ORDER SCHD FIN DATE | THE WORK ORDER SCHEDULED FINISH DATE (WORK_ORDER. SCHED_FINISH_DATE). |
| WORK ORDER ID | THE WORK ORDER ID (WORK_ORDER.BASE_ID,LOT) |
| SALES AMOUNT | ALLOCATED QUANTITY MULTIPLIED BY UNIT PRICE LESS DISCOUNTS AND COMMISSIONS. |
| MATERIAL COST | FROM WORK ORDER OR INVENTORY MULTIPLIED BY QUANTITY ALLOCATED. |
| SERVICE COST | FROM WORK ORDER OR INVENTORY MULTIPLIED BY QUANTITY ALLOCATED. |
| THROUGHPUT AMOUNT | SALES AMOUNT LESS MATERIAL COST AND SERVICE COST. |

| Date | Wday | Load Hours | Capacity | Load Capacity % |
|---|---|---|---|---|
| 4/17/2001 | Tue | 6.17 | 8.00 | 77.08% |
| 4/18/2001 | Wed | 8.00 | 8.00 | 100.00% |
| 4/19/2001 | Thu | 8.00 | 8.00 | 100.00% |
| 4/20/2001 | Fri | 8.00 | 8.00 | 100.00% |
| 4/23/2001 | Mon | 8.00 | 8.00 | 100.00% |
| 4/24/2001 | Tue | 8.00 | 8.00 | 100.00% |
| 4/25/2001 | Wed | 8.00 | 8.00 | 100.00% |
| 4/26/2001 | Thu | 8.00 | 8.00 | 100.00% |
| 4/27/2001 | Fri | 8.00 | 8.00 | 100.00% |
| 4/30/2001 | Mon | 8.00 | 8.00 | 100.00% |
| 5/1/2001 | Tue | 8.00 | 8.00 | 100.00% |
| 5/2/2001 | Wed | 8.00 | 8.00 | 100.00% |
| 5/3/2001 | Thu | 8.00 | 8.00 | 100.00% |
| 5/4/2001 | Fri | 8.00 | 8.00 | 100.00% |
| 5/7/2001 | Mon | 8.00 | 8.00 | 100.00% |
| 5/8/2001 | Tue | 8.00 | 8.00 | 100.00% |
| | | 126.17 | 128.00 | 98.57% |

FIG. 16

| SCREEN LABEL | DESCRIPTION |
| --- | --- |
| RESOURCE ID | THE RESOURCE ID (SHOP_RESOURCE.ID). |
| RESOURCE DESCRIPTION | THE RESOURCE DESCRIPTION (SHOP_RESOURCE.DESCRIPTION) |
| DATE | DATE FROM ENTERED DATE RANGE WHERE LOAD/CAPACITY EXISTS. |
| LOAD HOURS | SUM OF SETUP AND RUN FOR ALL OPERATIONS USING THIS RESOURCE ON THIS DATE. |
| CAPACITY | CAPACITY OF THIS RESOURCE ON THIS DATE. |
| LOAD CAPACITY RATIO | LOAD / CAPACITY EXPRESSED AS A %. |

Contention Inquiry Detail - [STANDARD 4/17/2001-5/8/2001]

| Workforce Assignment | Activity Number | Practice | Part ID | Description | Severity | Shortage Detail | Attempt Start | Attempt End |
|---|---|---|---|---|---|---|---|---|
| 40036/1 10 | 34 | F | MMT-1996-DM | DESK MODEL TELEPHONE | 1.07 | 1.8.16.8 | 4/17/2001 7:30:00 AM | 4/17/2001 9:10:00 AM |
| 40037/1 10 | 46 | F | MMT-1996-DM | DESK MODEL TELEPHONE | 8.15 | 1.8.16.8 | 4/17/2001 7:30:00 AM | 4/17/2001 9:10:00 AM |
| 40038/1 10 | 102 | F | MMT-1996-DM | DESK MODEL TELEPHONE | 14.15 | 1.8.18.3 | 4/17/2001 7:30:00 AM | 4/17/2001 9:10:00 AM |
| 40039/1 10 | 121 | F | MMT-1996-DM | DESK MODEL TELEPHONE | 16.24 | 1.8.18.3 | 4/17/2001 7:30:00 AM | 4/17/2001 9:10:00 AM |
| 40002/1 10 | 38 | F | | DESK MODEL TELEPHONE | 1.06 | 0.0.25.2 | 4/19/2001 8:30:00 AM | 4/20/2001 9:50:00 AM |
| 40040/1 10 | 131 | F | MMT-1996-DM | DESK MODEL TELEPHONE | 15.01 | 0.0.18.3 | 4/23/2001 7:30:00 AM | 5/8/2001 7:30:00 AM |
| 40045/1 10 | 56 | F | | | 1.19 | 0.0.15.0 | 4/26/2001 7:30:00 AM | 4/27/2001 11:50:00 AM |
| 40041/1 10 | 138 | F | MMT-1996-DM | DESK MODEL TELEPHONE | 8.10 | 0.0.18.3 | 5/2/2001 7:30:00 AM | 5/10/2001 9:50:00 AM |
| 40042/1 10 | 145 | F | MMT-1996-DM | DESK MODEL TELEPHONE | 12.20 | 0.0.7.7 | 5/2/2001 7:30:00 AM | 5/14/2001 12:10:00 PM |
| 40043/1 10 | 161 | F | MMT-1996-DM | DESK MODEL TELEPHONE | 13.19 | 0.0.9.7 | 5/2/2001 7:30:00 AM | 5/15/2001 11:50:00 AM |
| | | | | | 90.36 | | | |

FIG. 20

| SCREEN LABEL | DESCRIPTION |
|---|---|
| RESOURCE ID | THE RESOURCE ID (SHOP_RESOURCE.ID). |
| RESOURCE DESCRIPTION | THE RESOURCE DESCRIPTION (SHOP_RESOURCE.DESCRIPTION). |
| WORK ORDER / OPERATION | WORK ORDER AND OPERATION ID USING THE RESOURCE. |
| ATTEMPT NUMBER | THE ATTEMPT NUMBER WHICH THE WORK ORDER WAS ATTEMPTED TO BE SCHEDULED INTO THIS RESOURCE |
| DIRECTION | SCHEDULING DIRECTION (FORWARD OR BACKWARD). |
| ATTEMPT START | THE ATTEMPT WAS IN A BACKWARD DIRECTION AND ITS START DATE IS WITHIN THE RANGE. |
| ATTEMPT END | THE ATTEMPT WAS IN A FORWARD DIRECTION AND ITS END DATE IS WITHIN THE RANGE. |
| OPERATION START | THE START DATE OF THE LISTED OPERATION. |
| OPERATION END | THE END DATE OF THE LISTED OPERATION. |
| SEVERITY | FOR SUCCESSFULLY BACKWARD SCHEDULED WORK ORDER, "SEVERITY" REFERS TO THE DELTA BETWEEN END DATE OF FIRST "LOAD EXISTS" OCCURRENCE FOR AN OPERATION AND THE SCHEDULED FINISH DATE OF THAT OPERATION, MEASURED IN CALENDAR DAYS.<br><br>FOR A FORWARD SCHEDULED WORK ORDER, "SEVERITY" REFERS TO THE DELTA BETWEEN START DATE OF FIRST "LOAD EXISTS" OCCURRENCE FOR AN OPERATION AND THE SCHEDULED START DATE OF THAT OPERATION, MEASURED IN CALENDAR DAYS. |

| Work Order/Operation | Attempt Number | Location | Resource ID | Resource Description | Qty | Attempt Start | Attempt End |
|---|---|---|---|---|---|---|---|
| 40041/1 10 | 135 | F | FASSY | FINAL ASSEMBLY | 15.00 | 4/17/2001 12:00:00 AM | 5/2/2001 12:00:00 AM |
| 40042/1 10 | 142 | F | FASSY | FINAL ASSEMBLY | 15.00 | 4/17/2001 12:00:00 AM | 5/2/2001 12:00:00 AM |
| 40043/1 10 | 158 | F | FASSY | FINAL ASSEMBLY | 15.00 | 4/17/2001 12:00:00 AM | 5/2/2001 12:00:00 AM |
| | | | | | 45.00 | | |

| SCREEN LABEL | DESCRIPTION |
|---|---|
| PART ID | THE PART ID (PART.ID). |
| PART DESCRIPTION | THE PART DESCRIPTION (PART.DESCRIPTION). |
| WORK ORDER/OPERATION | WORK ORDER ID AND OPERATION NUMBER. |
| PIECE NUMBER | PIECE NUMBER FOR THE PART ON THE WORK ORDER. |
| ATTEMPT NUMBER | THE ATTEMPT NUMBER WHICH THE WORK ORDER WAS ATTEMPTED TO BE SCHEDULED INTO THIS RESOURCE. |
| DIRECTION | SCHEDULING DIRECTION (FORWARD OR BACKWARD). |
| ATTEMPT START | THE ATTEMPT WAS IN A BACKWARD DIRECTION AND ITS START DATE IS WITHIN THE RANGE |
| ATTEMPT END | THE ATTEMPT WAS IN A FORWARD DIRECTION AND ITS END DATE IS WITHIN THE RANGE. |
| OPERATION START | THE START DATE OF THE LISTED OPERATION. |
| OPERATION END | THE END DATE OF THE LISTED OPERATION. |
| SEVERITY | FOR A SUCCESSFULLY BACKWARD SCHEDULED WORK ORDER, "SEVERITY" REFERS TO THE DELTA BETWEEN END DATE OF FIRST "MATERIAL" OCCURRENCE FOR AN OPERATION AND THE SCHEDULED FINISH DATE OF THAT OPERATION, MEASURED IN CALENDAR DAYS.<br><br>FOR A FORWARD SCHEDULED WORK ORDER, "SEVERITY" REFERS TO THE DELTA BETWEEN START DATE OF FIRST "MATERIAL" OCCURRENCE FOR AN OPERATION AND THE SCHEDULED START DATE OF THAT OPERATION, MEASURED IN CALENDAR DAYS. |

| Work Order ID | Resource ID | Customer Name | Total Amount | Rate (...) | Resource $ | Parent ID | (date) | Part D | D |
|---|---|---|---|---|---|---|---|---|---|
| 02010/1 | 02010/1 | ABLE MANUFACTURING | $9,418.26 | 18.98 | $498.85 | 50003PK/1 | 3/29/2001 | WIDGET-CHROME | CHROME |
| 02009/1 | 02009/1 | RELIANCE INDUSTRIES | $4,848.50 | 18.19 | $266.55 | 50002PK/1 | 2/21/2001 | WIDGET-CHROME | CHROME |
| 02008/1 | 02008/1 | ABLE MANUFACTURING | $3,849.00 | 18.05 | $213.24 | 50001PK/1 | 1/24/2001 | WIDGET-CHROME | CHROME |

Resource ID: 5TON
Starting Date: 1/1/2001
Ending Date: 4/17/2001

| SCREEN LABEL | DESCRIPTION |
|---|---|
| CUSTOMER ORDER ID | THE CUSTOMER ORDER ID (CUSTOMER_ORDER.ID). |
| CUSTOMER NAME | THE CUSTOMER NAME (CUSTOMER.NAME). |
| PACKLIST ID | THE PACKLIST ID FROM THE SHIPPER (SHIPPER.PACKLIST_ID). |
| PACKLIST LINE NUMBER | THE LINE FROM THE SHIPPER LINE (SHIPPER_LINE.LINE_NO). |
| SHIP DATE | THE SHIPPED DATE FROM THE SHIPPER (SHIPPER.SHIPPED_DATE). |
| PART ID | THE PART ID ON THE CUSTOMER ORDER LINE (CUST_ORDER_LINE.PART_ID). |
| PART DESCRIPTION | THE PART DESCRIPTION FOR THE PART ON THE CUSTOMER ORDER LINE. (PART.DESCRIPTION). |
| QUANTITY SHIPPED | (CUST_ORDER_LINE.TOTAL_AMT_SHIPPED). |
| WORK ORDER QUANTITY | THE WORK ORDER QUANTITY (WORK_ORDER.DESIRED_QTY). |
| SALES AMOUNT | ALLOCATED QUANTITY MULTIPLIED BY THE UNIT PRICE, LESS DISCOUNTS AND COMMISSIONS. |
| MATERIAL COST | FROM WORK ORDER OR INVENTORY MULTIPLIED BY QUANTITY ALLOCATED. |
| SERVICE COST | FROM WORK ORDER OR INVENTORY MULTIPLIED BY QUANTITY ALLOCATED. |
| THROUGHPUT AMOUNT | SALES AMOUNT LESS MATERIAL COST AND SERVICE COST. |
| HOURS AT RESOURCE | THE TOTAL AMOUNT OF TIME REPORTED AT THE NAMED RESOURCE FOR THE WORK ORDER THAT WAS THE SOURCE OF THE MATERIAL AND SERVICE COST DATA DISTRIBUTED TO THE SHIPMENT. |
| THROUGHPUT PER HOUR | THROUGHPUT AMOUNT DIVIDED BY HOURS AT RESOURCE |

FIG. 27

| Work Order ID | Customer ID | Customer Name | Throughput amount | Throughput per Hour | Hours Resource | Ship Date | Reallocation Quantity |
|---|---|---|---|---|---|---|---|
| 40005/1 | 02004/1 | RELIANCE INDUSTRIES | $48,338.45 | $1,799.64 | 26.86 | 5/1/2001 | 4000 |
| 40003/1 | 02003/1 | ABLE MANUFACTURING | $42,918.82 | $1,397.55 | 30.71 | 5/7/2001 | 5000 |
| 40004/1 | 02003/2 | ABLE MANUFACTURING | $42,342.95 | $1,378.80 | 30.71 | 6/8/2001 | 5000 |
| 02006/1 | 02006/1 | RELIANCE INDUSTRIES | $14,384.53 | $1,065.52 | 13.50 | 5/8/2001 | 50 |
| 40002/1 | 02002/1 | CENTRE GROUP | $6,088.85 | $358.17 | 17.00 | 4/30/2001 | 500 |

FIG. 28

| SCREEN LABEL | DESCRIPTION |
|---|---|
| WORK ORDER ID | THE WORK ORDER ID (WORK_ORDER.BASE_ID, LOT). |
| CUSTOMER ORDER ID | THE CUSTOMER ID. |
| CUSTOMER NAME | THE CUSTOMER NAME (CUSTOMER.NAME). |
| PART ID | THE PART ID ON THE CUSTOMER ORDER LINE (WORK_ORDER_LINE.PART_ID). |
| PART DESCRIPTION | THE PART DESCRIPTION FOR THE PART ON THE CUSTOMER ORDER LINE. (PART.DESCRIPTION). |
| SOFT ALLOCATION QUANTITY | QUANTITY FOR THIS WORK ORDER WHICH WAS COMPUTED THE LAST TIME THE CREATE SOFT ALLOCATIONS FUNCTION WAS EXECUTED. |
| WORK ORDER QUANTITY | THE WORK ORDER QUANTITY (WORK_ORDER.DESIRED_QTY). |
| SALES AMOUNT | ALLOCATED QUANTITY MULTIPLIED BY THE UNIT PRICE, LESS DISCOUN AND COMMISSIONS. |
| MATERIAL COST | FROM WORK ORDER OR INVENTORY MULTIPLIED BY QUANTITY ALLOCATED. |
| SERVICE COST | FROM WORK ORDER OR INVENTORY MULTIPLIED BY QUANTITY ALLOCATED. |
| THROUGHPUT AMOUNT | SALES AMOUNT LESS MATERIAL COST AND SERVICE COST. |
| HOURS AT RESOURCE | THE TOTAL AMOUNT OF TIME NEEDED AT THE NAMED RESOURCE FOR THE WORK ORDER. |
| THROUGHPUT PER HOUR | THROUGHPUT AMOUNT DIVIDED BY HOURS AT RESOURCE |

FIG. 29

SYSTEM AND METHOD FOR THROUGHPUT MEASUREMENT

CROSS-REFERENCE TO RELATED APPLICATION

This application is a divisional of Ser. No. 09/421,834 filed Oct. 20, 1999 now U.S. Pat. No. 7,039,595 and claims priority to U.S. Provisional Patent Application Ser. No. 60/105,129, filed Oct. 21, 1998.

TECHNICAL FIELD

The invention relates to manufacturing facility management and, more particularly, to computer-based tools for improving the profitability of manufacturing facilities.

BACKGROUND INFORMATION

Manufacturing facility management use metrics to measure the productivity of a manufacturing facility, and to determine what changes can be made to improve the operation of the facility. Metrics are used because generally it is difficult for any one person to otherwise understand how a large, complex system such as a manufacturing facility is performing. The choice of metric is important because changes that improve the facility as measured by the chosen metric are judged to be worthwhile and are encouraged by facility management. Changes that deplete the operation of the plant, as measured by the chosen metric, are judged to be detrimental to the operation of the facility, and are therefore discouraged by facility management.

One metric that is used is the "idle time" of resources such as employees and equipment. Sometimes also referred to as the "utilization" or "efficiencies" of those resources, the metric measures the amount of time that the resources are busy. Other metrics that have been suggested in the art, for example in the book THE GOAL, by Eliyahu M. Goldratt and Jeff Cox, first published in 1984, are the measurements of throughput, inventory, and operating expense. Throughput is defined to be the rate at which a system generates money through sales. Inventory is defined to be all the money that the system has invested in purchasing things that it intends to sell. Operating expense is defined to be all the money the system spends in order to turn inventory into throughput. (See Goldratt and Cox, pp. 60-61.) These three metrics can be used to measure overall profitability as well as the profitability of any element within a manufacturing system. For example, the "throughput value" of any element can be determined by calculating the amount that the element contributes to the generation of profit through sales.

SUMMARY OF THE INVENTION

Although computer-based tools have been available for the purpose of managing systems such as manufacturing plants, there is a need for a software tool that can help a manufacturing facility management increase throughput without increasing inventory and operating expense.

As throughput is defined as the money a system generates through sales, the throughput value $(X_i)$ of an item (i) produced by a system is its net selling price $(P_i)$, where net selling price is the selling price less any discounts and commissions, minus its materials cost $(M_i)$ and the cost of any outside services required to manufacture the item $(O_i)$. This can be written mathematically as: $X_i = P_i - M_i - O_i$. To measure the throughput associated with an item, it is therefore necessary to determine its net selling price $(P_i)$, its materials cost $(M_i)$, and the cost of any outside services required to manufacture the item $(O_i)$. The throughput of a quantity of a particular item can be expressed as a rate of money generated through sales of that quantity of items over a period of time. Both actual throughput, which is throughput based on past activity, and expected throughput, which is throughput based on anticipated future plans can be determined.

Throughput is an interesting metric because the throughput associated with a particular item is not affected by the number of internal resources required to produce the item. Internal resources do not affect net selling price $(P_i)$, materials cost $(M_i)$, or outside services $(O_i)$. Outside services, by definition, do affect the measured throughput. If a manufacturing facility increases overall throughput without increasing operating expenses, profit increases. One way to increase total throughput is to identify bottlenecks, which are resources (or materials) that most limit the ability of the manufacturing facility to increase its throughput. Changes that have the effect of increasing throughput at the bottleneck also increase profitability. Changing the nature of the work done by the manufacturing facility, so that the throughput value per hour at the bottleneck increases, also increases profitability.

Examples of bottlenecks are the resources that have the least available capacity, the resources for which there is the greatest contention for capacity, and materials for which lack of availability causes the greatest disruption in the production schedule. Identification of such bottlenecks, is a first step to increasing profitability. There may be one or more than one bottleneck in a system. The resource or material that is the bottleneck may change depending on the work to be performed and/or on the planned schedule for accomplishing the work. Changes in capacity and/or availability of material may also change which resource or material is a bottleneck.

Computer-based software tools according to the present invention provide information about actual (i.e. past) throughput, and expected (i.e. future) throughput. The tools can be used in combination with a scheduling tool, such as a tool which concurrently schedules materials and resources, to plan in a manner that maximizes throughput.

In general, in one aspect, the invention features a computerized method for determining throughput. The method includes generating a demand array of item orders and generating a supply array of manufacturing inventory. The method includes selecting an item order in the demand array, and matching manufacturing inventory in the supply array with the selected item order. The method also includes assigning a throughput value to the selected item order based on the matched manufacturing inventory.

In one embodiment, the method also includes calculating the throughput value of the item order by subtracting the matched inventory materials cost and outside services cost from the selected item order net selling price.

In one embodiment, the step of generating a demand array includes generating a demand array of unshipped customer line items. In another embodiment, the step of generating a demand array includes generating a demand array of shipped customer orders. In one embodiment, the step of generating a supply array includes generating a supply array of inventory work orders. In another embodiment, the step of generating a supply array includes generating a supply array of manufactured inventory.

In one embodiment, the step of generating a demand array includes generating a demand array of customer order line items, and the step of generating the supply array includes generating a supply array of inventory work orders. The step of assigning a throughput value to the selected item order includes determining the selling price from the customer order line item, determining the materials costs and the outside service cost from the matched inventory work order, calculating the throughput value of the item order by subtracting the determined materials cost and the determined outside services costs from the determined selling price, and assigning the calculated throughput value to the selected item order.

In one embodiment, the steps of selecting, matching, and assigning are repeated until all of the manufacturing inventory in the supply array have been allocated. In another embodiment, the steps of selecting, matching, and assigning are repeated until all of the item orders in the demand array have been allocated.

In another embodiment, the method includes calculating the sum total throughput for all of the ordered items. In another embodiment, the matching step includes matching the inventory work order with the customer order line item according to the sequence in which the inventory work orders are stored in the demand array and the sequence in which the inventory work orders are stored in the supply array. In one embodiment, the method also includes the step of generating a list of any unmatched customer order line items. In another embodiment, the method also includes the step of generating a list of unmatched inventory work orders.

In general, in another aspect, the invention features a computerized method for identifying the contention severity of a resource. The method includes identifying a first start/date time to assign a task to a resource, determining whether the resource is already allocated at the first date/time, and determining a second date/time at which the resource is available if the resource is already allocated at the first date/time. The method also includes determining the time difference between the first date/time and the second date/time as the contention severity of the resource.

In general, in another aspect, the invention features a computerized method for identifying contention severity of a material. The method includes identifying a first start date time to assign a material to a task, determining whether the material is already allocated at the first date/time, and determining a second date/time at which the material is available if the material is already allocated at the first date/time. The method also includes determining the time difference between the first date/time and the second date/time as the contention severity of the material.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is an embodiment of a soft allocations data table;

FIG. 8 is an embodiment of detail data for the graph of FIG. 7;

FIG. 9 is a list of data elements for the embodiment of FIG. 8;

FIG. 10 is an embodiment of an expected throughput inquiry display;

FIG. 12 is an embodiment of detail data for the graph of FIG. 11;

FIG. 13 is a list of data elements for the embodiment of FIG. 12;

FIG. 14 is an embodiment of a utilization inquiry screen;

FIG. 16 is an embodiment of detail data for the graph of FIG. 15;

FIG. 17 is a list of data elements for the embodiment of FIG. 16;

FIG. 18 is an embodiment of a contention inquiry screen;

FIG. 20 is an embodiment of detail data for the graph of FIG. 19;

FIG. 21 is a list of data elements for the embodiment of FIG. 20;

FIG. 22 is an embodiment of a material constraint inquiry screen;

FIG. 24 is an embodiment of detail data for the graph of FIG. 23;

FIG. 25 is a list of data elements for the embodiment of FIG. 24;

FIG. 26 is an embodiment of an actual throughput by resource inquiry screen;

FIG. 27 is a list of data elements for the embodiment of FIG. 26;

FIG. 28 is an expected throughput by resource inquiry screen; and

FIG. 29 is a list of data elements for the embodiment of FIG. 28.

DESCRIPTION

Figure 1:
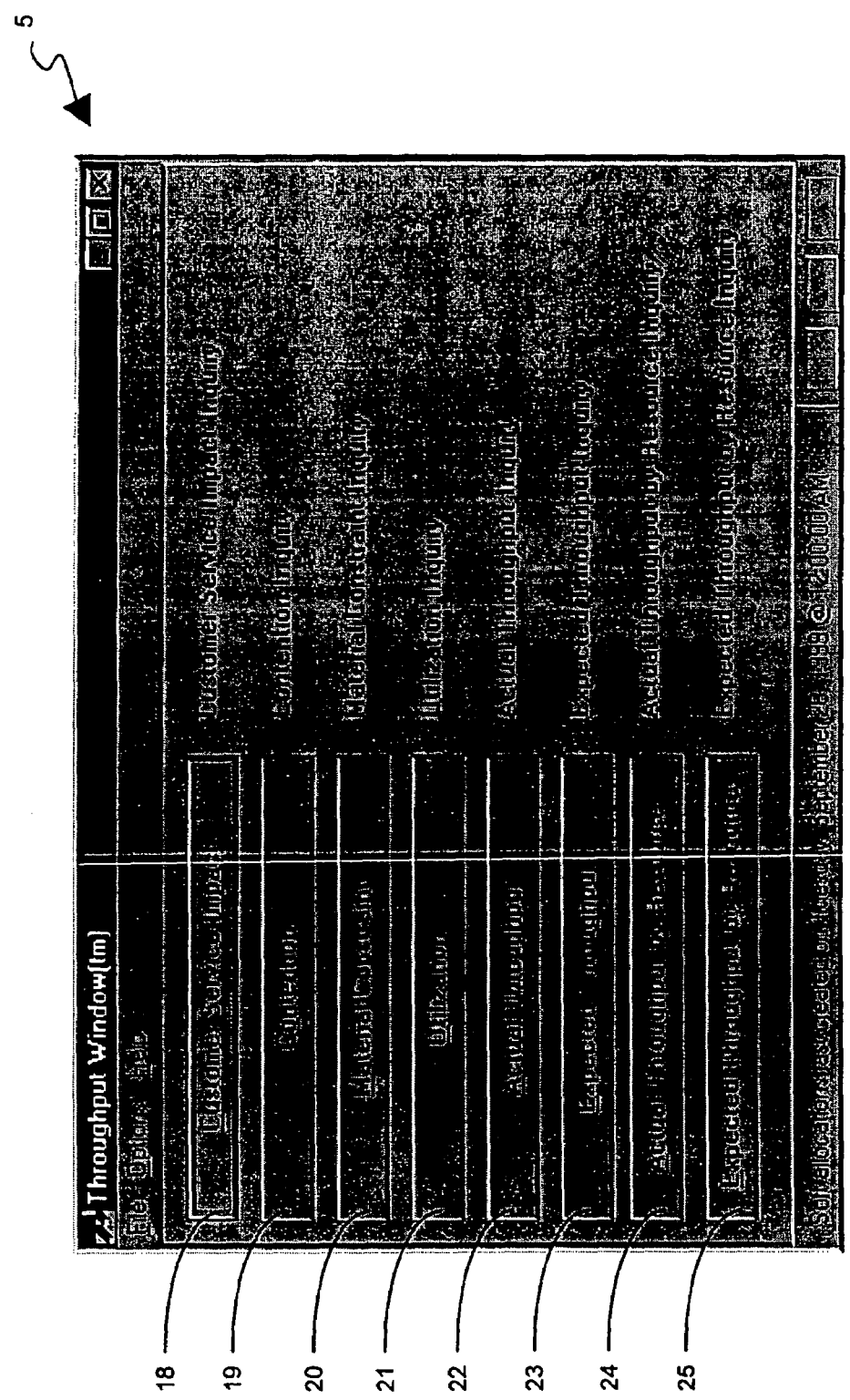
FIG. 1 is an embodiment of a throughput measurement tool selection interface.

Referring to FIG. 1, a user interface 5 for software tools provides a selection of tools that can be used to measure throughput and identify bottlenecks. In the embodiment presented, the tools are implemented as software running on a general-purpose computer, specifically software running on an INTEL PENTIUM-based personal computer running the MICROSOFT WINDOWS NT operating system. The invention is not intended to limit the invention to this particular implementation, rather, the implementation presented is intended to provide a useful example.

The user interface, referred to as the Throughput Window 5, allows the user to select inquiries for Customer Service Impact Inquiry 18, Contention Inquiry 19, Material Constraint Inquiry 20, Utilization Inquiry 21, Actual Throughput Inquiry 22, Expected Throughput 23, Actual Throughput by Resource 24, and Expected Throughput by Resource 25.

Figure 2:
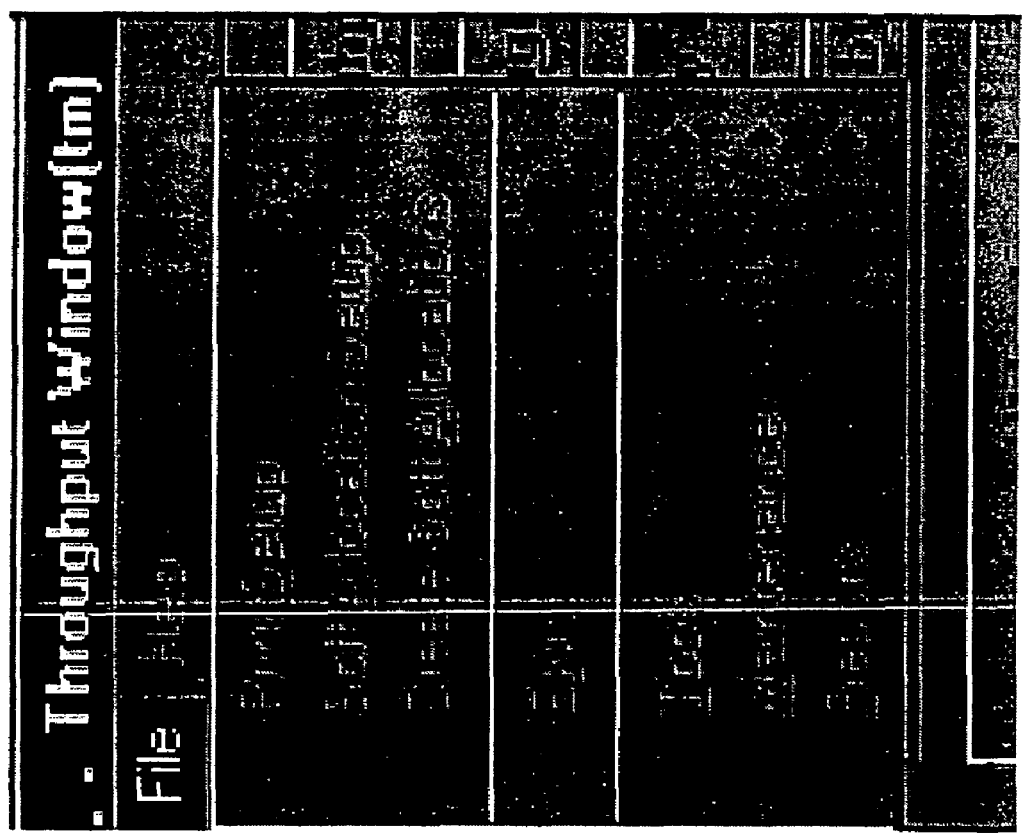
FIG. 2 is an embodiment of the embodiment of the file menu of FIG. 1.

Referring to FIG. 2, the File menu of the Throughput Window 5 allows a user to configure printing ("Print Setup"), configure soft allocations ("Soft Allocation Setup"), and to initiate the soft allocations function ("Create Soft Allocations"). The soft allocations function is discussed further below. In one embodiment, all configuration information for the tools is stored in a text file named VMTHRWIN.INI. In one embodiment, multiple inquiries can be run and viewed simultaneously.

Calculation of throughput involves determination of the net selling price ($P_i$), the materials cost ($M_i$), and the cost of outside services ($O_i$). In one embodiment, the net selling price ($P_i$) for an item is determined from customer orders, and materials cost ($M_i$) and outside services cost ($O_i$) are determined from work orders and from inventory. The supply (i.e. work orders and inventory) are matched up with demand (i.e. customer orders) to determine the source (or origin) for the net selling price and the material and service cost. This matching, referred to as soft allocations, may or may not determine which items actually are used for which customer orders. For example, the allocation may be used solely for the calculation of metrics such as throughput. Soft allocations are accomplished separately from the metric calculating and reporting mechanisms that use the soft allocations, so that the soft allocations can be allocated once, and numerous reports and/or inquiries utilities can use the same soft allocations information. For example, the expected throughput for several different schedules can be compared using the same soft allocations.

Soft allocations are created by a software tool, referred to as a soft allocations generator. Soft allocations can be generated automatically at a scheduled time or upon manual initiation by a user. As shown in FIG. 2, the file menu of an embodiment of the Throughput Window 5 includes a selection ("Create Soft Allocations") that initiates generation of soft allocations.

Referring to FIG. 3, the soft allocations generator uses a data table that correlates between an item and its source of material and service cost information. The elements of the soft allocations data table include a customer order identifier ("CUST_ORDER_ID"), a customer order line number ("CUST_ORDER LINE NO"), a part identifier ("PART_ID"), a work order identifier ("WO_BASE_ID"), a work order lot identifier ("WO_LOT_ID"), a work order split identifier ("WO_SPLIT_ID"), and a quantity allocated to this customer order line item from this source. These elements provide the necessary information to identify the customer order, to which the item is allocated, and the work order that is the source of the item, if the demand is not supplied from existing inventory.

It is possible that some work orders may already be "linked" to customer orders outside of the soft allocations process. For example, if a make-to-order part is made specifically for a particular customer, the customer order for that make-to-order part may be linked to the work order for that part. The soft allocations generator can be configured to recognize such links, and to allocate first the customer orders and work orders that are linked. If work orders and customer orders are not already linked, they are matched based on their dates. In other words, the earliest customer orders are matched to existing inventory. After current inventory is allocated, work orders are allocated, based on the desired completion date of the work order. The soft allocations generator generates a row in the soft allocations table for each unshipped customer order line to which a work order is matched. The soft allocations generator verifies that the total quantity allocated for work orders matched to a customer order does not exceed the desired quantity. There may be inventory listed in the system that has been labeled "unavailable" or "on-hold" for various reasons. A user can optionally configure the soft allocations generator to allocate a quantity that is unavailable or an on-hold quantity.

When the soft allocations are generated, all existing soft allocation records are removed from the soft allocations table. All allocations are recalculated and the soft allocations table is regenerated. The soft allocations generator creates a first array, referred to as a "demand array" of unshipped customer order line items, to which soft allocations have not been made in full. In one embodiment, these are sequenced by part identifier and desired ship date. The soft allocations generator also creates a second array, referred to as a "supply array," of inventory, firmed (planned and scheduled but deliberately not yet allowed to be worked on) work orders, and released (planned, scheduled and intended to be worked on) work orders from which soft allocations have not been made in full. These are in want-date (desired completion date) sequence. A work order that has co-products, meaning that more than one part will be produced by the work order, appears in this array multiple times, once for each part being produced.

One by one, in the order that they are stored in the demand array, each customer order line item is matched to inventory and firmed and released work orders in the supply array. Optionally, the user can configure the soft allocations generator to allocate inventory labeled as "unavailable" and "on hold." If the customer order line item in the demand array is fully satisfied by the soft allocations, the customer order line is removed from the demand array. When all inventory has been allocated, allocations are made from the next work order for that item. The process is finished for an item when either all the supply (inventory and work orders) or demand (line items from customer orders) have been allocated.

Optionally, a list of unallocated customer order lines and of unallocated work orders are provided in an audit text file. This may be helpful to manufacturing facility management because it identifies customer orders for which work orders have not been allocated, and work orders for which there are no customer orders. There may be good reasons for a manufacturing facility to have work orders for which there are no customer orders, for example because of a forecasted demand. It still may be useful for manufacturing facilities management to review the list and verify that there are in fact good reasons why unallocated customer orders and work orders appear on the list.

Figure 4:
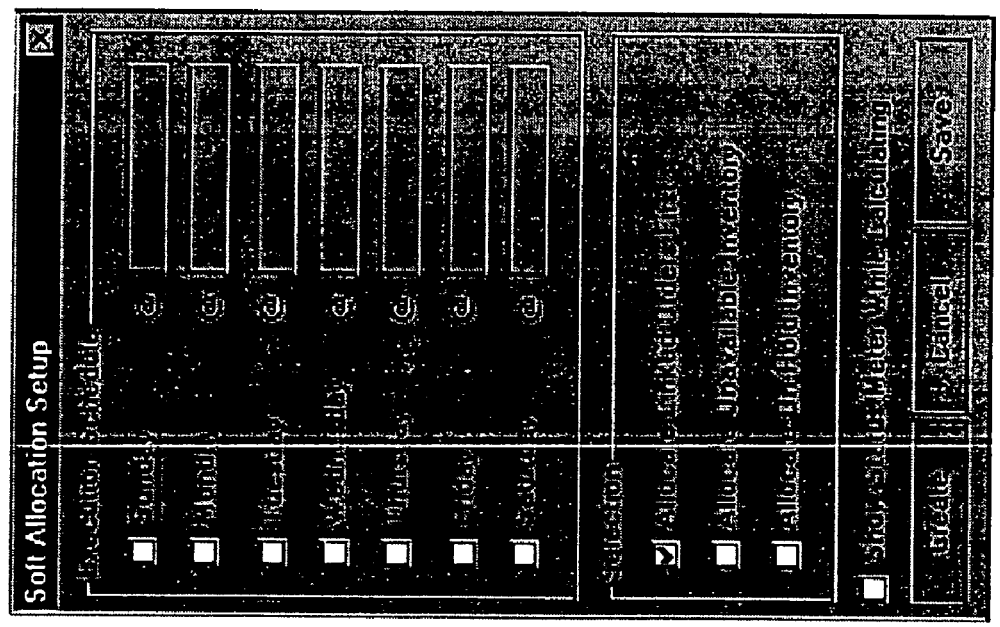
FIG. 4 is an embodiment of a soft allocations setup screen.
Figure 5:
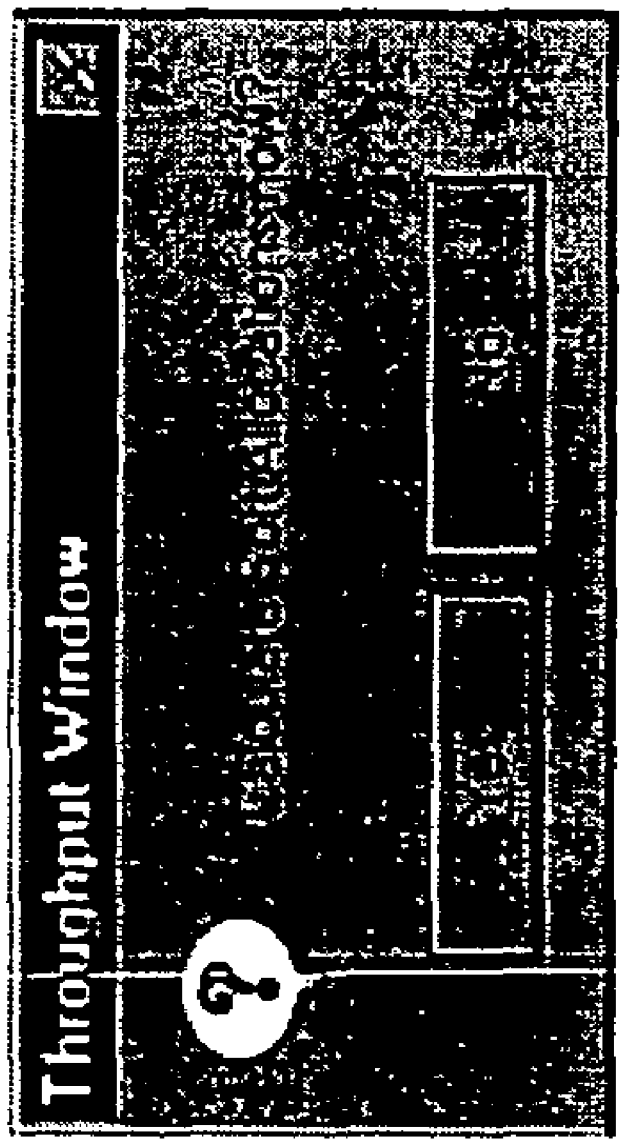
FIG. 5 is an embodiment of a soft allocations confirmation screen.

Referring briefly again to FIG. 2, the Soft Allocations can be configured from the File Menu of the Throughput Window 5, with the choice of "Soft Allocation Setup." The soft allocation configuration options are show in FIG. 4 on a Soft Allocation Setup window control when soft allocations are generated. The generator can be configured to automatically generate soft allocations at a particular time each day. For example, the generator can be configured to generate soft allocations once a day at midnight, or once a week on Wednesday at 3:06 P.M. A timer runs as software that is "sleeping" until the specified time for execution arrives. The Soft Allocation Setup is used to control when the Soft Allocations function is executed. A confirmation screen, shown in FIG. 5, confirms that Soft Allocations should be processed.

Referring again to FIG. 4, the user is also presented with three options on the Soft Allocation Setup Window: (1) Allocate Linked Orders First; (2) Allocate Unavailable Inventory; and (3) Allocate On-Hold Inventory. One or more of these options can be selected at the same time. The Allocate Linked Orders First option, which is a default, causes a new row in the soft allocations table to be generated for each unshipped customer order line to which a work order is linked. The Allocate Unavailable Inventory and Allocate On-Hold Inventory options allow the soft allocations generator to allocate inventory that has been labeled "unavailable" and "on-hold" respectively. The soft allocations generator verifies that the total quantity allocated for a linked work order does not exceed the desired quantity on that work order.

Referring again to FIG. 1, a tool is provided to measure actual throughput, which is a measurement of past performance. This tool can be accessed by selecting the Actual Throughput Inquiry 22 from the Throughput Window 5.

Actual invoiced amounts from shipments and actual material and outside service costs from receipts (work orders or purchase orders depending on whether the items are made or purchased for resale) are used to compute actual throughput.

For actual throughput, the net selling price ($P_i$) is determined from the packlist line unit price. The packlist is a list that is included with a shipment. Each line on the packlist identifies a quantity of items (parts) in the shipment. The packlist line unit price is the unit price listed for those items in the packlist less any discounts and commissions. In other words, the shipping price is used as the net selling price ($P_i$), as determined from the packlist, and less any discounts and commissions. The material cost ($M_i$) and outside service cost ($O_i$) are determined from cost distributions made to the shipment line, meaning a subset of the costs that most manufacturing financial systems provide to present the cost of goods sold. For example, often the material cost ($M_i$) and outside service cost ($O_i$) is generated for a gross profit report. The relevant time period is determined from the packlist date, that is the date on the packlist, because this is when the product was "sold."

An actual throughput report is similar in some respects to a gross profit report, which is a report that shows gross profit for shipped customer orders by subtracting material, labor, burden and outside service costs from the sales amount. A gross profit report presented as a table, which is the typical way of presenting such information, is limited because it shows the profit for a single date range. It can be much more useful to show actual throughput and to summarize the throughput weekly and monthly in graph format for twelve periods at a time.

A primary difference between a gross profit report and a throughput report is that calculation of gross profit involves allocation of labor cost and burden cost to each item. The allocation of burden and labor cost, in general, can be counter-productive, because it is very difficult to allocate accurately. The throughput model, which treats burden and labor as fixed costs outside of the throughput calculation, produces better overall results because the impact on profitability of delivering one additional customer order in the same time period can be easily discerned. If no increase in operating expense is incurred (e.g. overtime), then the entire throughput value of the extra customer order will become profit. If operating expense must increase, then the difference between the throughput value of the extra order and the increase in operating expense will become profit.

Figure 6:
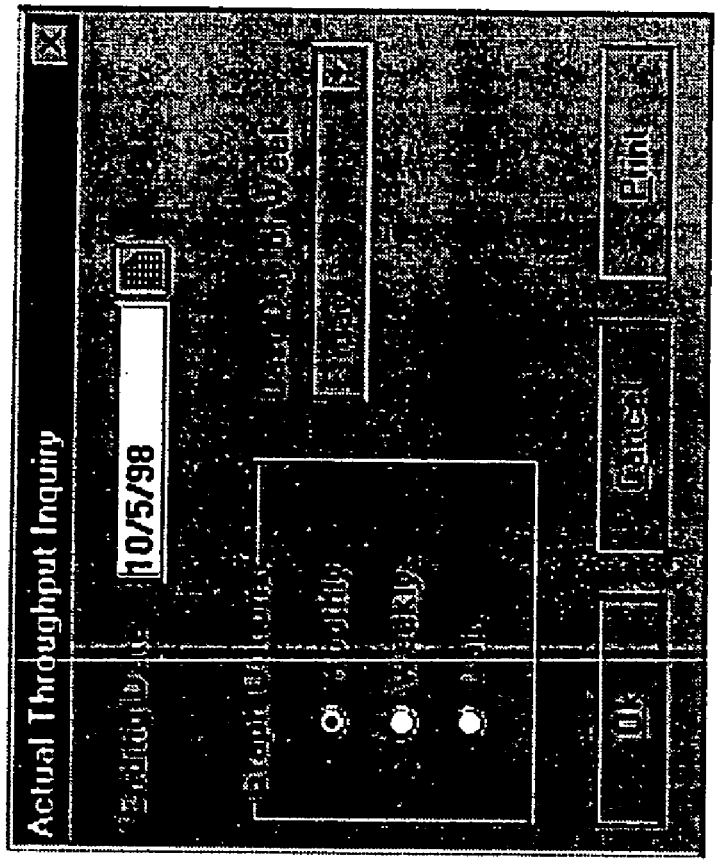
FIG. 6 is an embodiment of an actual throughput inquiry display.

Referring to FIG. 6, an actual throughput inquiry window provides options for monthly, weekly and daily graphical reporting of actual throughput for the current period and a selectable number of periods (i.e. days, weeks, or months). If the monthly mode is selected, the actual throughput is shown for this calendar month and for each of the previous number of selected months (the default is six months). The ending date defaults to the current calendar month if not entered by the user. If the weekly mode is selected, the "Last Day of Week" box, shown in FIG. 6, is enabled to allow the entry of the day of week to set the day to be used as the last day of the week. In weekly mode, the actual throughput is shown for this week and for each of the selected number of previous weeks (the default is 8 weeks). The user can select the ending date. The ending date defaults to the current calendar date if not entered by the user. If the daily mode is selected, the actual throughput is shown for the entered date and for each of the selected previous number of days (the default is fourteen). The ending date defaults to the current system date, as determined by the user's computer, if not entered by the user.

Figure 7:
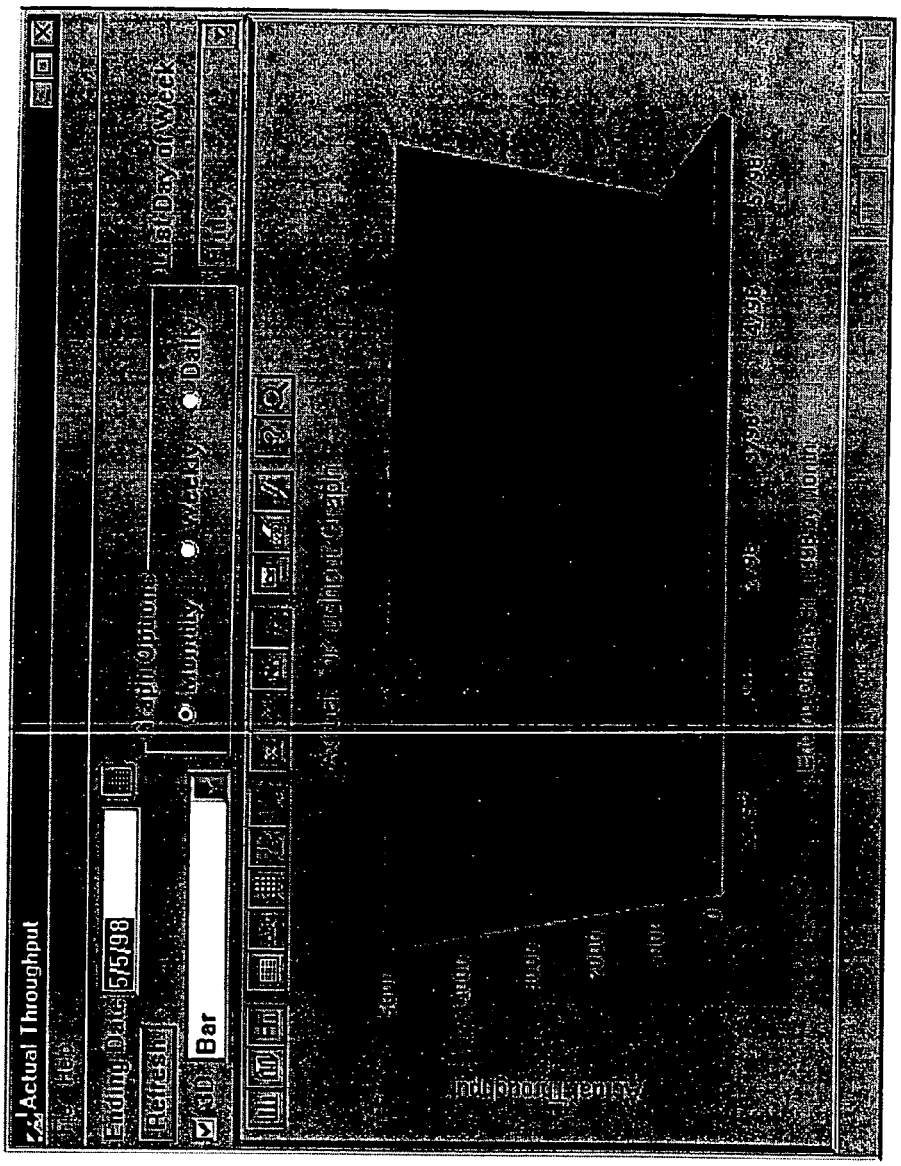
FIG. 7 is an embodiment of an actual throughput graph.

Referring to FIG. 7, in "monthly mode," a bar graph shows actual throughput for the current calendar month and for a configurable number of previous months (the default is six months). The user can change the "base" month to display that month and the previous number of months. In another embodiment, in "weekly mode", a bar graph shows actual throughput for each of a configurable number of previous weeks (the default is eight weeks). The user can define on which day a week ends and can change the "base" week. Changing the base week causes the program to display that week and the previous number of weeks.

The actual throughput graph display in FIG. 7 is a 3D bar graph. When mouse clicks are applied to a bar on the graph, graph detail data, shown as FIG. 8, is displayed. The graph detail data is displayed on a screen with movable and re-sizable columns. The graph detail data summarizes the daily, weekly or monthly detail represented by that bar. Referring to FIG. 9, which provides a list of the data shown in FIG. 8, the graph detail data can include a customer order identifier, a customer name, a packlist identifier, a customer order line number, a part identifier (from the customer order line), the last ship date (from the customer order line), the quantity shipped (from the customer order line), the sales amount (which is allocated quantity multiplied by the unit price less discounts and commissions), material cost (from work order or inventory), service cost (from work order or inventory), and the throughput value.

Referring again to FIG. 1, a tool is provided to measure expected throughput, which is a measurement of future performance. This tool can be accessed by selecting the Expected Throughput Inquiry 23 on the Throughput Window 5. Existing inventory and/or open work orders are used to provide the necessary information for material cost ($M_i$) and outside service cost ($O_i$). The price ($P_i$) is determined by a customer order line number, that is the expected net selling price on unshipped customer order line items. Per item costs from work orders are computed. This can be accomplished by subtracting projected material and service costs for other items being made on the same work order (co-products) from the projected material and service costs for the whole work order, yielding projected material and service costs for the item in question. These costs are divided by the desired quantity on the work order to derive a per item cost for the work order. Generally, costing utilities do not distribute costs to unshipped customer order line items. In one embodiment, this is done using soft allocations, as described above, so that expected throughput is computed using the costs from work orders which are soft-allocated to each customer order line.

Prior to initiating an expected throughput inquiry, Soft Allocations are generated, for example by choosing the Create Soft Allocations option on the File menu (FIG. 2) to create a soft allocations table. Supply (i.e. work orders and inventory) is matched with demand (i.e. customer orders) by the soft allocations process, as described above. If the soft allocations table data was not created on the same day that the expected throughput inquiry is run, the user may be reminded to run the soft allocation generator. The entries in the soft allocations table enable the operation of expected throughput inquiry.

Figure 10:
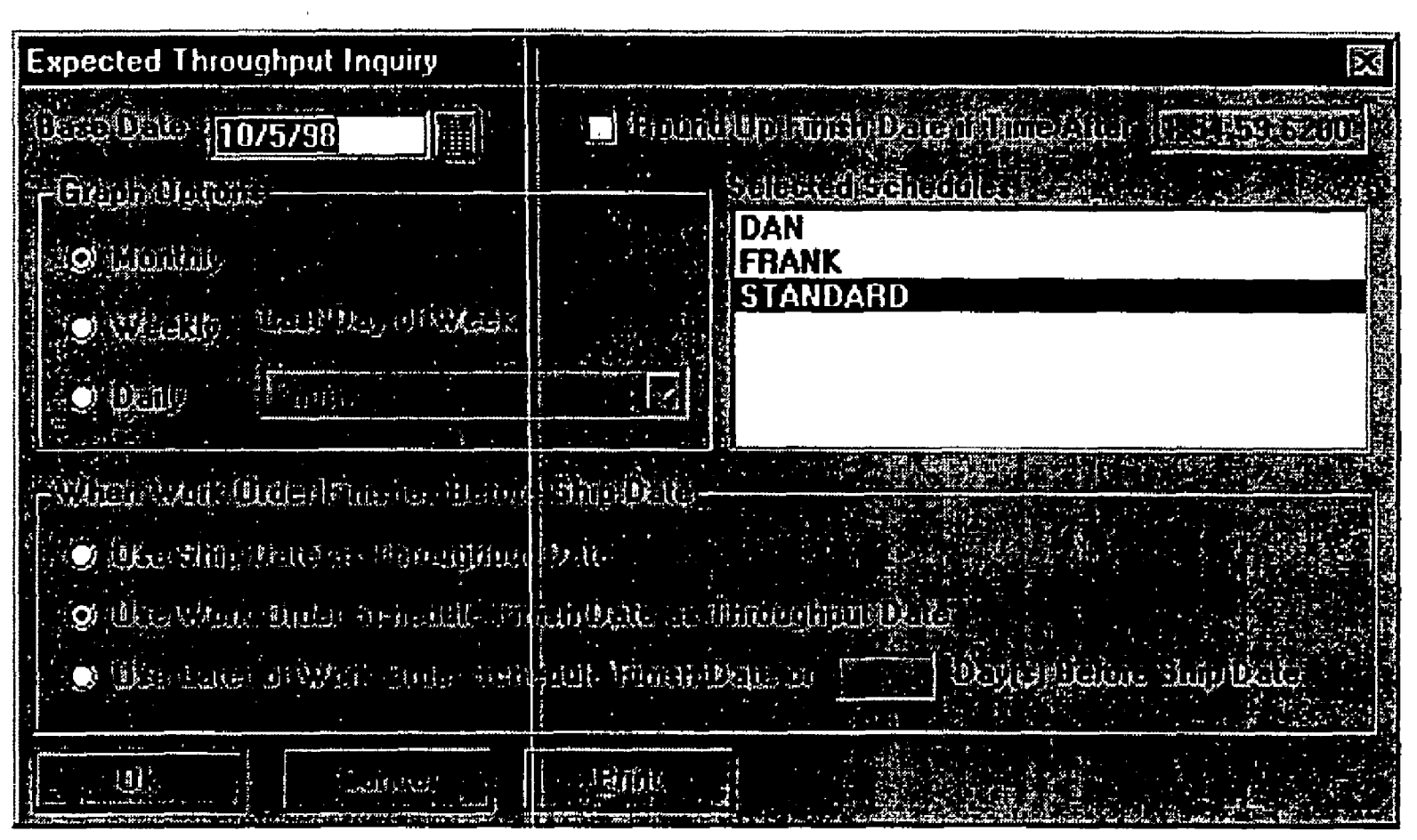

Referring to FIG. 10, the expected throughput inquiry provides options for monthly, weekly, and daily graphical reporting of expected throughput for the current period and next twelve periods (weeks or months) for one or more schedules. In one embodiment, the STANDARD schedule is the default schedule. The graph screen contains an option to print the graph and print the table window detail used to create the graph.

If the monthly mode is selected, the expected throughput is shown for this calendar month and for each of a configurable number of months (default is six months) for each Schedule ID selected. The base date defaults to the current calendar month if not entered by the user. If the weekly mode is selected, a Last Day of Week box is enabled to allow the entry of the Day of Week to set the day be used as the last day of the week. The expected throughput is shown for this week and for each of a configurable number weeks (default is eight weeks) for each Schedule ID selected. The user may define on which day a week ends. The user can change the base date, which causes the program to display that week and the next twelve weeks. The base date defaults to the current calendar date if not entered by the user. If the daily mode is selected, the actual throughput is shown for the entered date and for each of a configurable number of days for each Schedule ID selected. The Base Date defaults to the current system date (client) if not entered by the user.

For the purposes of this discussion, the date on which a customer order line item becomes throughput is referred to as the "throughput date." For customer order line items that are soft allocated from inventory, the throughput date is the desired ship date. For line items that are soft allocated from work orders, the throughput date normally is the scheduled finish date in the selected schedule of the final operation of the work order. In one embodiment, users can modify this procedure. If the scheduled finish date is after a certain time (for example, 6 PM), then the day after the scheduled finish date is used as the date on which throughput occurs. The reason for doing this is that the facility may not be expected to ship items at 11:00 P.M. In another embodiment, if the throughput date is earlier than the desired ship date of the customer order line item, the desired ship date is used, because some customers refuse early shipments. In yet another embodiment, in cases where the work order is going to finish before the desired ship date of the customer order line item, the later of the scheduled finish date or a date that is a user-specified number of days prior to the desired ship date of the customer order line item is used. Some customers will take early shipments, but not earlier than a certain number of days.

Upon commencement of the expected throughput inquiry, the sales amount, the material cost, the service cost, the throughput date, and the total throughput are calculated for each entry in the soft allocations table. The sales amount is the allocated quantity multiplied by the unit price, less discounts and commissions. The material cost is derived from work order or inventory (as described above), and is multiplied by quantity allocated. The service cost is derived from work order or inventory (as described above), and is multiplied by the quantity allocated. The throughput date is determined as described above. The calculated throughput is the sales amount less material cost and service cost.

Figure 11:
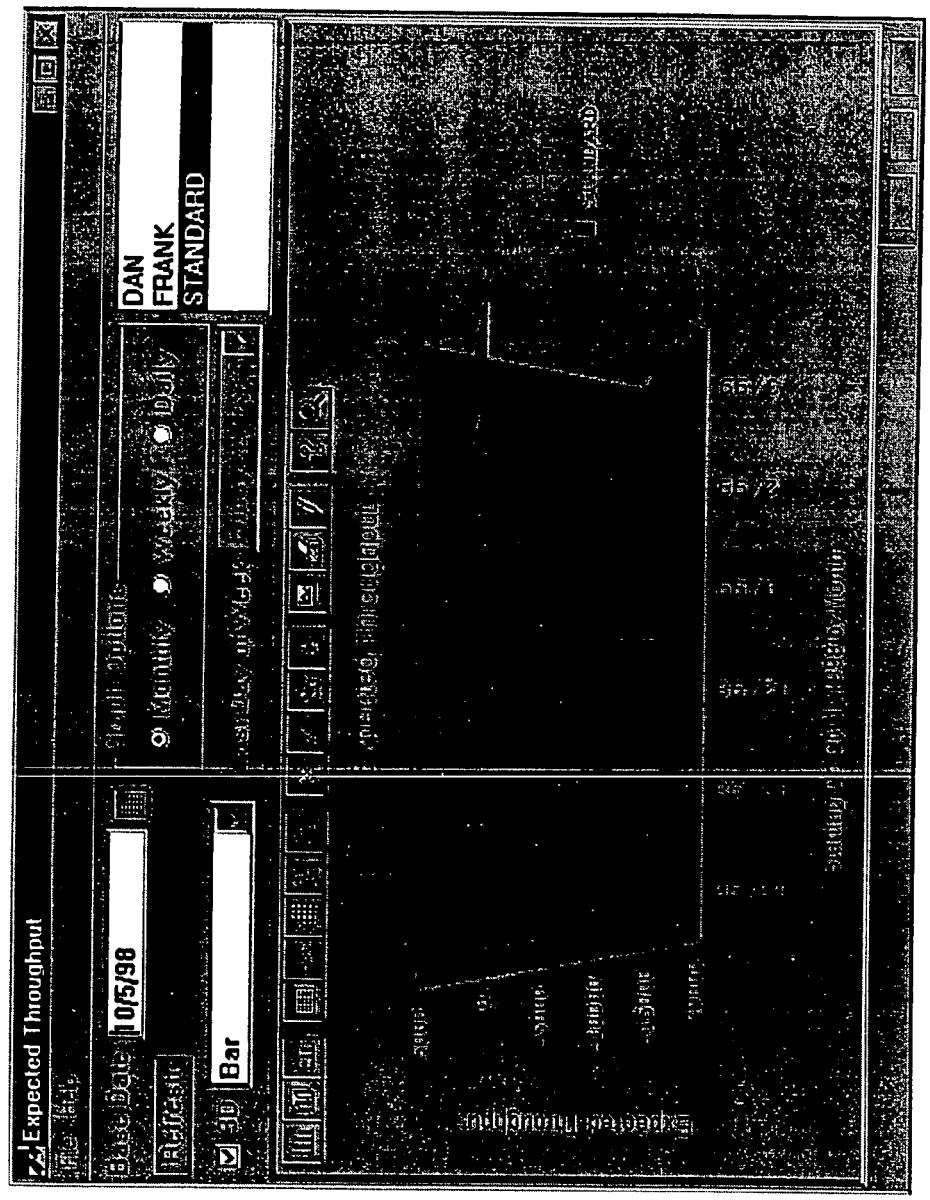
FIG. 11 is an embodiment of an expected throughput graph.

An example of an expected throughput graph is shown in FIG. 11 as a 3D bar graph. When mouse clicks are applied to a bar on the expected throughput graph of FIG. 11, graph detail data is displayed. Referring to FIG. 12, the expected throughput detail data is shown in a window that contains movable and re-sizable columns that summarize to the daily, weekly or monthly detail represented by the selected bar.

Referring to FIG. 13, the graph detail data includes a customer order identifier, a customer name, a part identifier (from the customer order line), a work order identifier, a want date (from the work order), a quantity (from the customer order line), the work order scheduled finish date, the sales amount (which is allocated quantity multiplied by the unit price less discounts and commissions), material cost (from work order or inventory), service cost (from work order or inventory), and the throughput value.

Referring again to FIG. 1, three tools are provided to identify a bottleneck, described above as the material or resource that most limits the ability of a facility to increase its throughput. One tool, a utilization inquiry, determines which resource has the highest load/capacity ratio during a specified time period. A second tool, a contention inquiry, determines which resource has the most contention, that is, the resource that is already allocated most frequently when attempts are made to schedule it. The resource that has the most contention is the resource most likely to make use of any additional capacity. The contention inquiry can be a better method for identifying bottlenecks than the utilization inquiry for that reason. A third tool, a material constraint inquiry, determines the item causing the most material delay during a specified time period. In one embodiment, each of these three inquiries can be selected from the Throughput Window 5.

Figure 14:
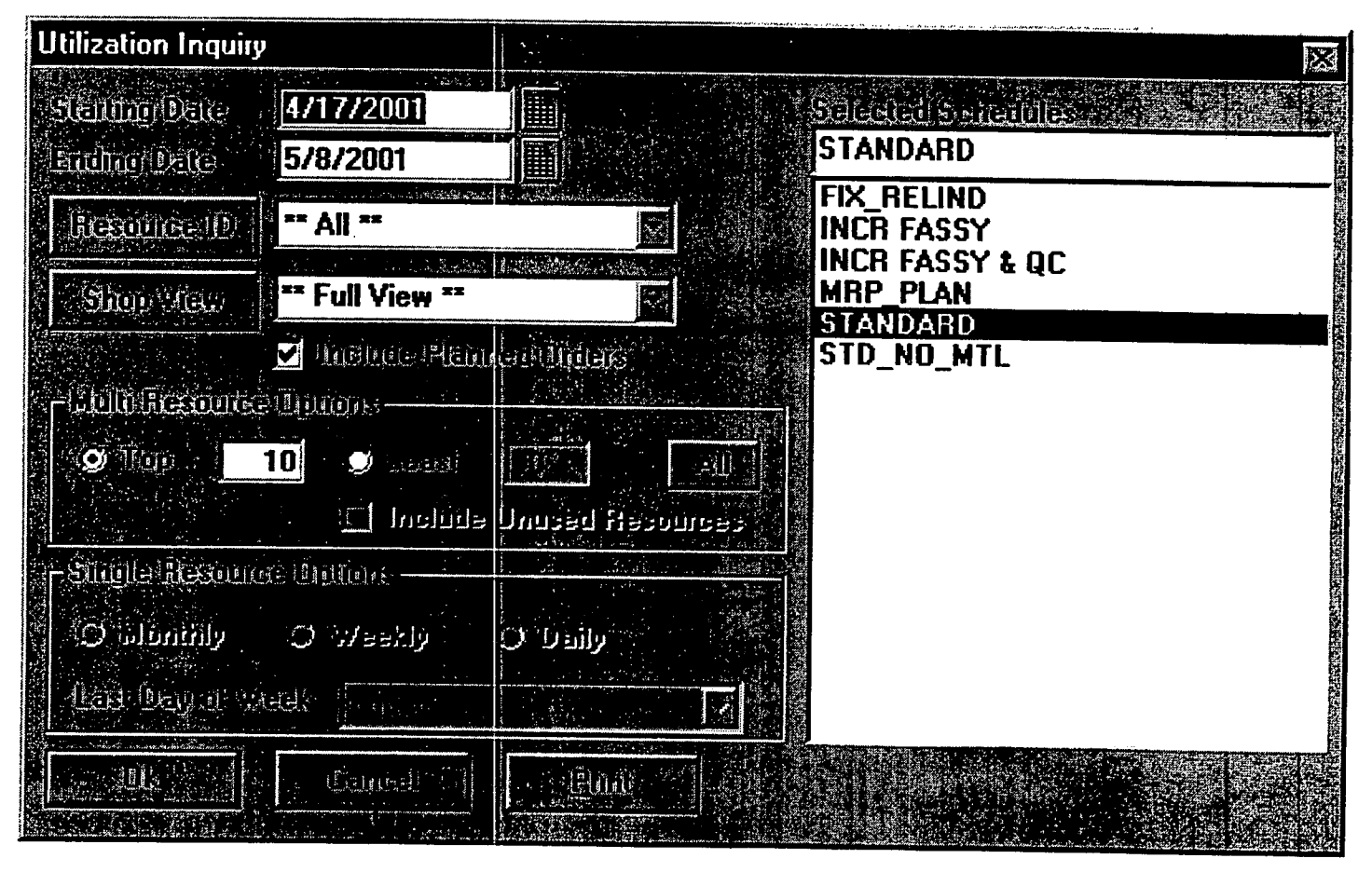

Referring to FIG. 14, a utilization inquiry determines which resource has the highest load/capacity ratio during a specified time period. In other words, the utilization inquiry identifies the busiest resources. The utilization inquiry prompts for a starting and ending date range, resource identifier, a choice of daily, weekly, or monthly display, an ending day of week and one or more schedules to use for measurement. In one embodiment, if a resource identifier is not entered, a bar graph for each schedule showing a specified number of resource identifiers with the highest load/capacity ratio in the time period, sorted from highest to lowest (or sorted lowest to highest) is displayed. In one embodiment, the specified number of resource identifiers is selectable by the user; ten is the default number that is displayed. If the highest ratio resource is much greater than the resource in second place, then it is likely that that resource is a bottleneck. If a resource identifier is entered, a bar graph showing the load/capacity ratio over time in each schedule for the selected resource is displayed. Days on which there is no capacity in the resource are not included in the daily display.

Figure 15:
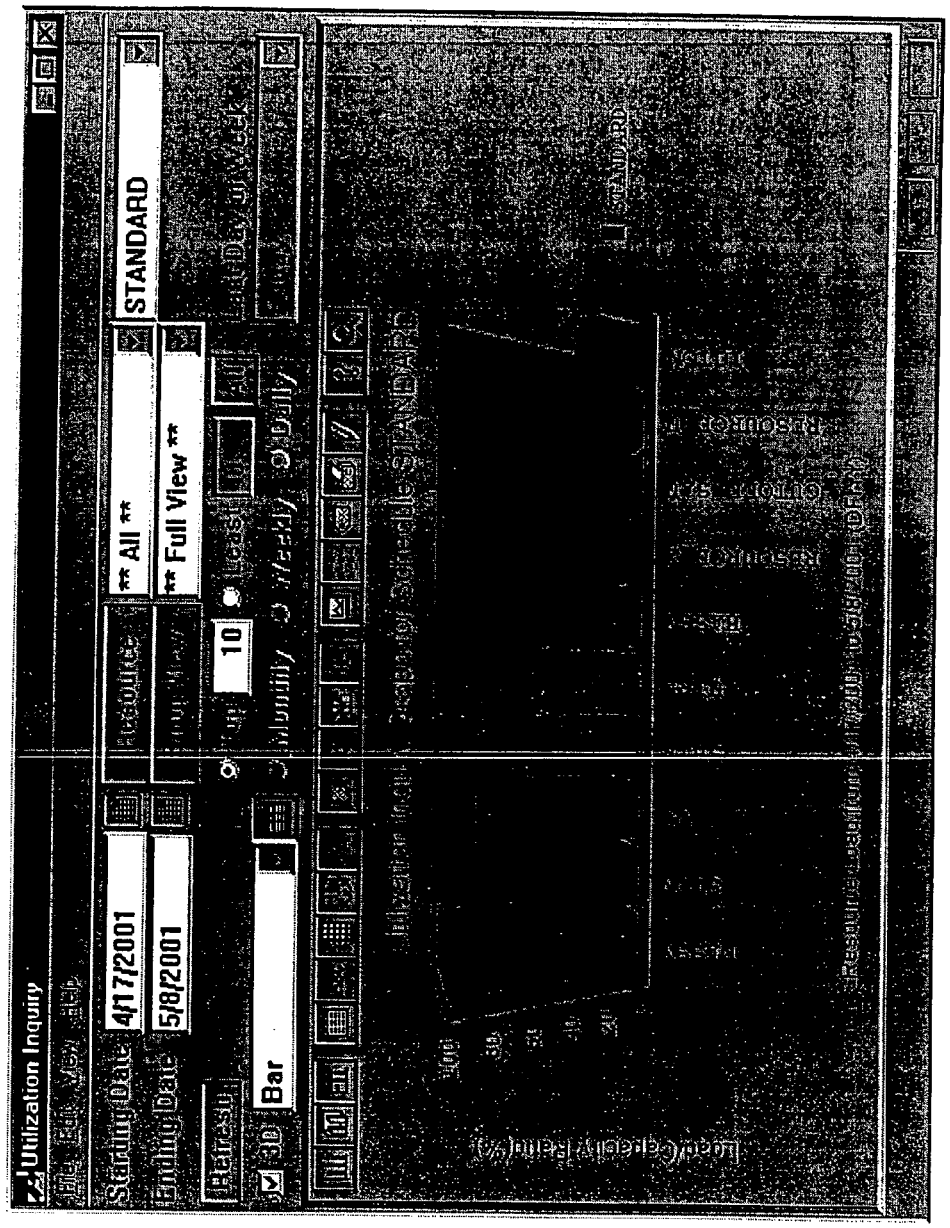
FIG. 15 is an embodiment of a utilization graph.

Referring to FIG. 15, an embodiment of a utilization inquiry graph is shown as a 3D bar graph. When mouse clicks are applied to a bar on the graph, graph detail data is displayed. One embodiment of such a graph detail data display is shown in FIG. 16. This display contains movable and re-sizable columns that summarize the detail for the resource represented by the selected bar. The detail includes only days on which there is capacity in the resource. In one embodiment, the graph detail data includes the data shown in FIG. 17. The data includes a resource identifier, a resource description, data from the entered date range where the load/capacity exists, total load on the resource for that date, the capacity of the resource for that date, and the load/capacity ratio expressed as a percentage.

Figure 18:
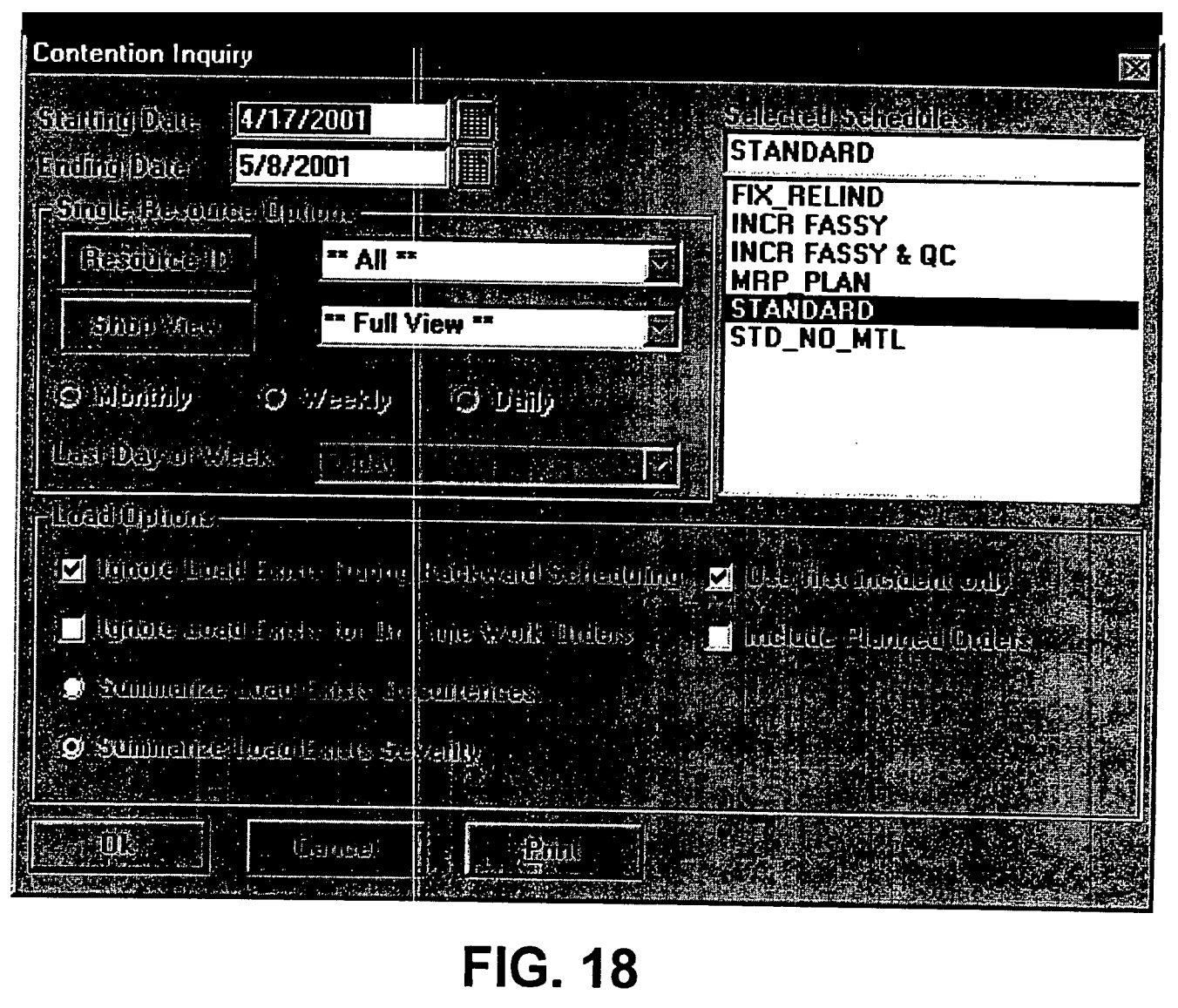

Referring to FIG. 18, a resource is not necessarily a bottleneck just because it is busy. If several resources have high utilization, it is possible that only some and not all of the resources are bottlenecks. A contention inquiry is useful for identifying the resources for which the scheduling/planning software experienced the most contention. If the scheduling conflicts are great for a particular resource, that resource is likely to be a bottleneck. Scheduling conflicts can be measured in a number of ways. In one embodiment, the number of scheduling conflicts at a resource, meaning the number of other work orders with which a work order conflicts as it is scheduled for time at a resource, is used as the contention metric. In another embodiment, contention severity is measured by the amount of displacement caused by contention for that resource, that is the delay that is caused by the contention.

In one embodiment, a forward scheduler attempts to assign a task to a resource at a first, attempted start date/time. If the resource is already allocated, the forward scheduler finds the next (following) available block of time in which the resource is available. When such a time block is found, the forward scheduler allocates the resource to that task beginning at a second, scheduled start date/time. In one embodiment, the difference in time between the first, attempted start date/time and the second, scheduled start date/time is the contention severity. In another embodiment, the time difference is measured in working days.

In another embodiment, a backward scheduler attempts to assign a task to a resource at a first, attempted finish date/time. If the resource is already allocated, the backward scheduler finds the next (previous) available block of time in which the resource is available. When such a time block is found, the backward scheduler allocates the resource to that task ending at a second, scheduled finish date/time. In one embodiment, the difference in time between the first, attempted finish date/time and the second, schedule finish date/time is the contention severity. In another embodiment, the difference is measured in calendar days.

Alternatively, in yet another embodiment, the number of contention occurrences can be measured. A contention counter is incremented each time there is contention for a particular resource, that is, each instance that the forward or backward scheduler tries to schedule a work order at that resource and finds it busy at the desired time.

As shown in FIG. 18, the contention inquiry prompts for a starting and ending date range and one or more schedule identifiers. The user can inquire about one resource, a subset of the available resources, or all resources. The resources are identified by a resource identifier. A user can specify daily, weekly, or monthly reporting. The user can specify the day to be considered the last day of the week to be used for weekly reporting. The user can choose to ignore contention during backward schedule attempts, if for example the user does not care about backward attempts, or to ignore contention for on-time work orders (on the theory that the user does not care if there is contention as long as parts are produced by the desired date). In one embodiment, the user can select display of contention severity ("Summarize Load Exists Severity") or display of the number of contention occurrences ("Summarize Load Exists Occurrences").

For each selected schedule, the program displays a bar graph showing a predetermined number of resource identifiers with the highest number of contention occurrences or severity for the selected time period. In one embodiment, the predetermined number of resource identifiers is configurable by the user, with a default of ten. A contention condition falls into the user's date range if: the attempt was in a backward direction and its end date is within the range, or if the attempt was in a forward direction and its start date is within the range.

Figure 19:
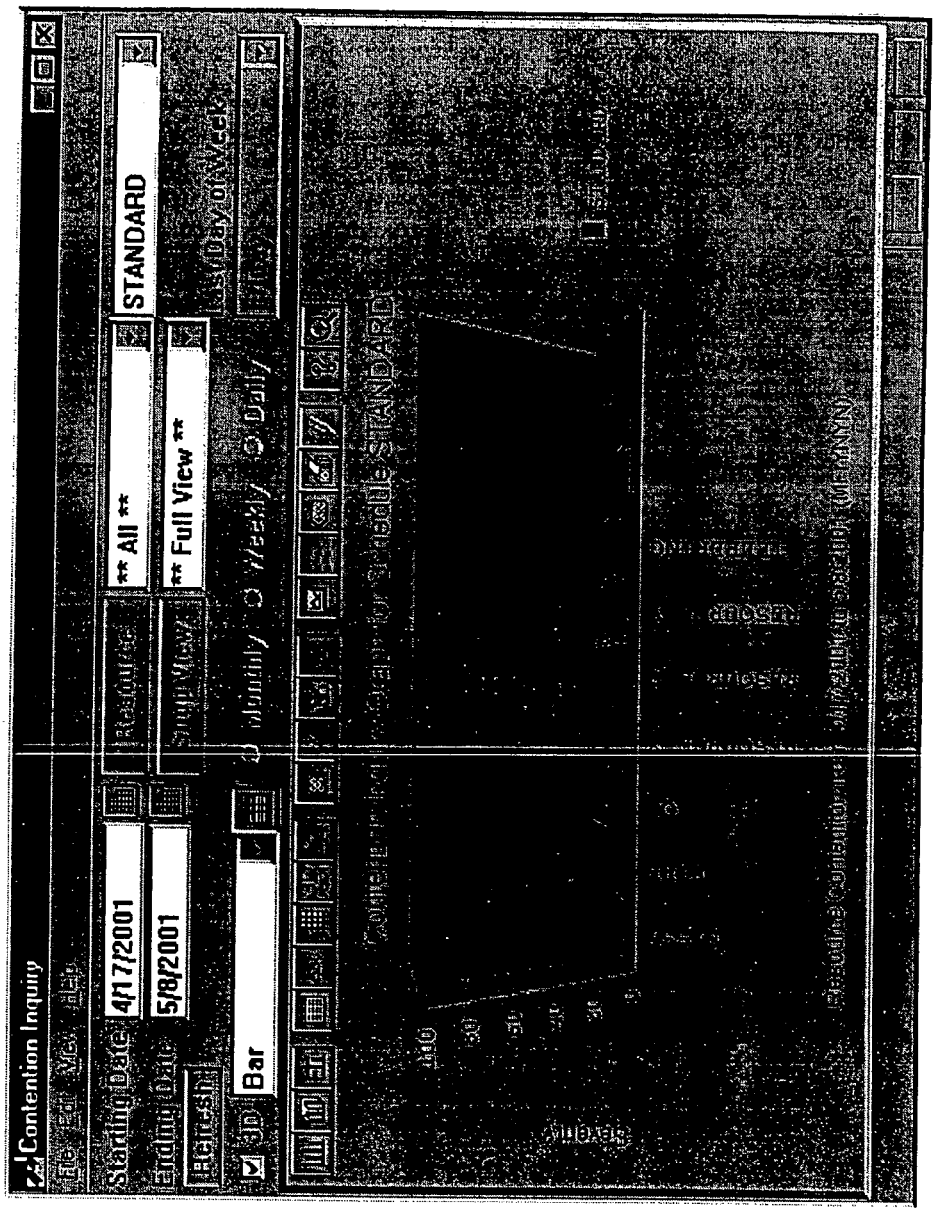
FIG. 19 is an embodiment of a contention graph.

Referring to FIG. 19 a contention inquiry screen display is a 3D bar graph. When mouse clicks are applied to a bar on the graph, graph detail data is displayed. An embodiment of graph detail display is shown as FIG. 20. This window contains movable and re-sizable columns that summarize the detail for the resource identifier represented by the selected bar. The detail includes only scheduling attempts which were unsuccessful due to existing load.

Referring to FIG. 21, the graph detail data used to create the display in FIG. 20 includes a resource identifier, a resource description, a work order and operation identifier, an attempt number in which the work order was attempted to be scheduled at the resource, a scheduling direction (e.g., "F" for forward), attempt start date, attempt end date, the start date of the listed operation, the end date of the listed operation, and the severity in time. For a successfully backward scheduled work order, severity refers to the delta between end date of first load exists occurrence for an operation and the scheduled finish date of that operation, measured in calendar days. Similarly, for a forward scheduled work order, severity refers to the delta between start date of first load exists occurrence for an operation and the scheduled start date of that operation, measured in calendar days.

Figure 22:
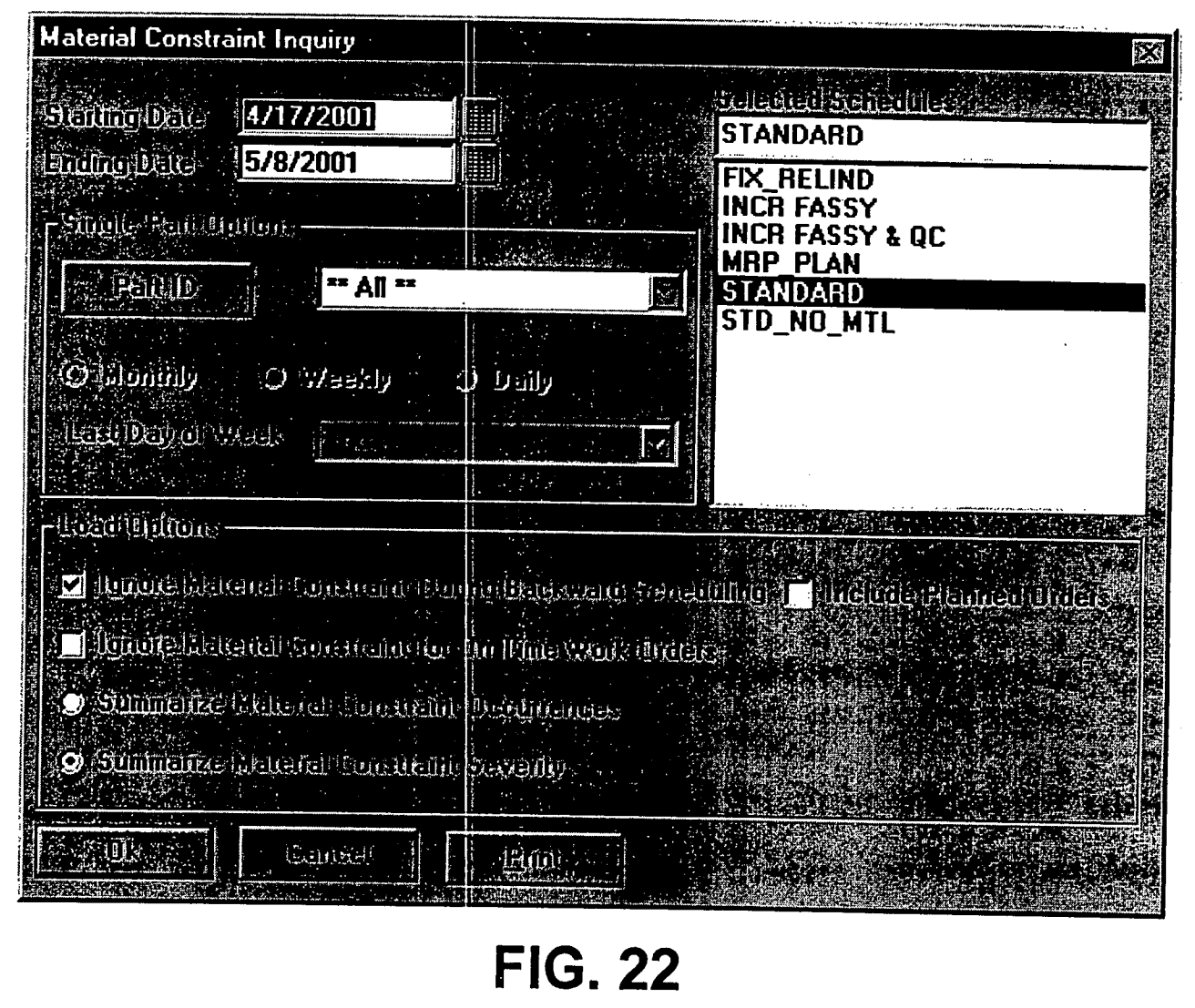

Referring to FIG. 22, the material constraint inquiry identifies bottleneck materials, such as raw materials and purchased parts. The material constraint inquiry identifies the materials that cause the most disruptions in the schedule. The material inquiry is similar to the contention inquiry but is different in that it identifies material, for example by part identifier, rather than a resource.

In one embodiment, a forward scheduler attempts to assign a required number of parts (material) to a task at a first, attempted start date/time. If no parts are available, for example because all of that type of part are already allocated, the forward scheduler finds the next (following) available time in which the parts are projected to be available, taking into consideration existing orders for the part, other needs for the same part and the lead-time for acquiring the part. When such a date/time is found, the forward scheduler allocates the parts to that task beginning at a second, scheduled start date/time at which the needed resource capacity is also available. In one embodiment, the difference in time between the first, attempted start date/time and the projected date/time of material availability is the material constraint severity. In another embodiment, the difference in time between the first, attempted start date/time and the second, scheduled start date/time of the operation is the material constraint severity. The time difference is measured in calendar days.

In another embodiment, a backward scheduler attempts to assign a required number of parts (material) to a task at a first, attempted finish date/time. If no parts are available, for example because all the parts are already allocated, the backward scheduler finds the next (previous) available date/time in which the parts should be available and makes note of it. Since further backward scheduling would be fruitless, the system discontinues processing in a backward direction and begins to schedule the entire order in a forward direction. Ultimately a scheduled completion date of the operation which needs that material is arrived at. When such a time is found, the scheduler allocates the parts to that task ending at a second, scheduled finish date/time. In one embodiment, the difference in time between the first, attempted start date/time and the projected date/time of material availability is the material constraint severity. In another embodiment, the difference in time between the first, attempted finish date/time and the, scheduled finish date/time is the material constraint severity. The difference is measured in calendar days.

Alternatively, the number of material constraint occurrences can be measured. A contention counter is incremented for each occurrence when there is contention for material, that is, each instance that the forward or backward scheduler attempts to schedule material for a work order and finds that the material is to be already allocated.

Still referring to FIG. 22, the material constraint Enquiry prompts for a starting and ending date range and one or more part (item) identifiers. The user can inquire about one part, a subset of the available parts, or all parts. The parts are identified by a part identifier. A user can specify daily, weekly, or monthly reporting. The user can specify the last day of the week to be used for weekly reporting. The user can choose to ignore material constraint during backward schedule attempts or to ignore material constraint for on-time work orders. In one embodiment, the user can select display of material constraint severity or display of the number of constraint occurrences.

Figure 23:
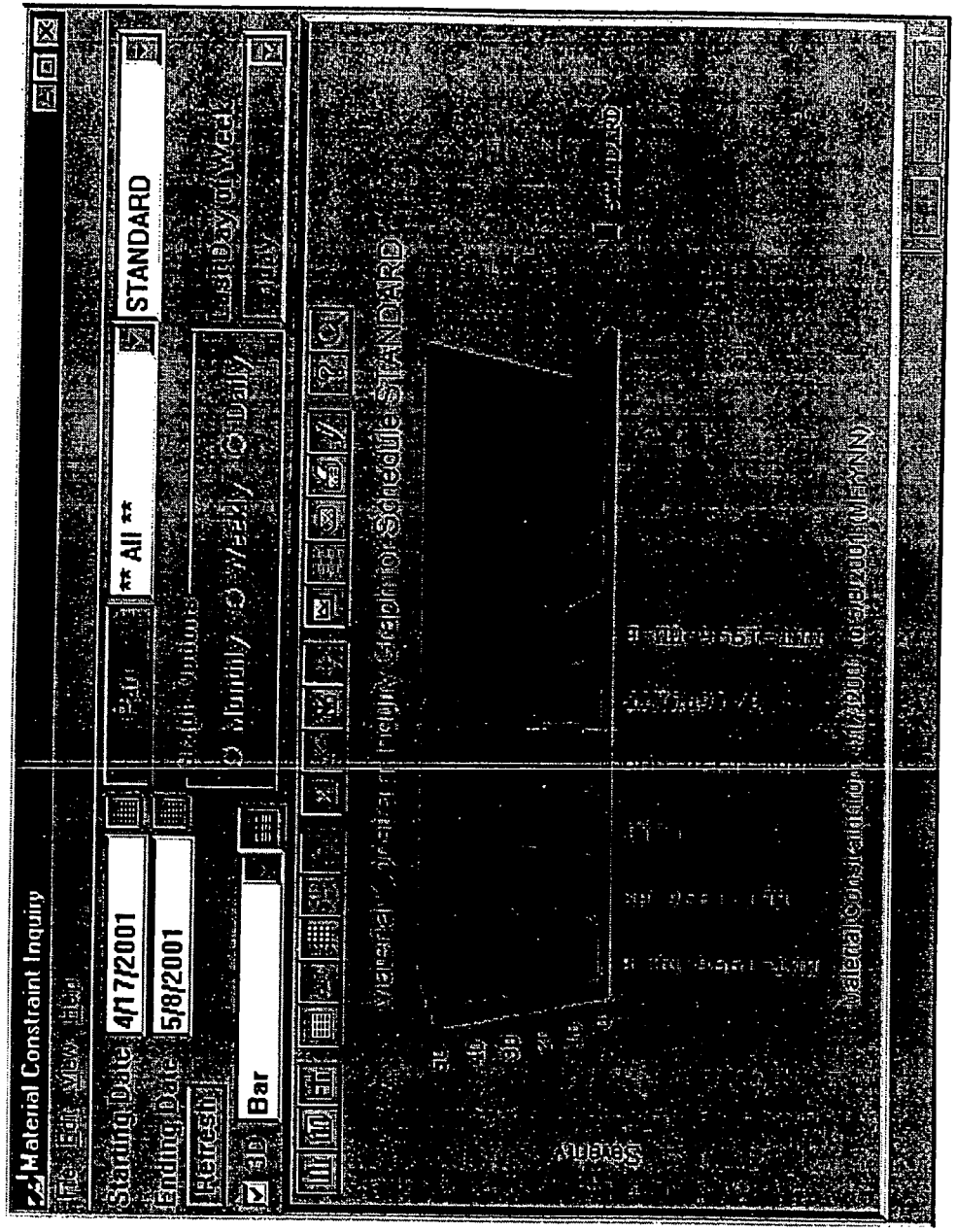
FIG. 23 is an embodiment of a material constraint graph.

Referring to FIG. 23, for each selected part, the material constraint inquiry displays a bar graph showing a predetermined number of part identifiers with the highest number of material constraint occurrences or severity for the selected time period. In one embodiment, the predetermined number of part identifiers is ten. A material constraint condition falls into the user's date range if the attempt is within the range. The embodiment of the material constraint inquiry screen display shown in FIG. 23 as a 3D bar graph.

In one embodiment, when mouse clicks are applied to a bar on the graph, graph detail data is displayed. One embodiment of graph detail display is shown in FIG. 24. This window contains movable and re-sizable columns that summarize the detail for the resource identifier represented by the selected bar. The detail includes only days on which there is capacity in the resource. As shown in FIG. 24, three resources, each having an individual contention severity value, are displayed along with related information for each resource. In addition, FIG. 24 shows a total contention severity which is calculated by summing the contention severity for each task or material requirement, respectively. The total contention severity is displayed in the contention severity column and in the lower region of the detail window. Referring to FIG. 25, the graph detail data includes a part identifier, a part description, a work order and operation identifier, a piece number for that part on the operation, the attempt number on which the work order was attempted to be scheduled, a scheduling direction, attempt start date, attempt end date, the start date of the listed operation, the end date of the listed operation, and the severity in time.

Referring to FIG. 1, it can be useful to measure not only the expected and actual throughput for a particular item, but also to determine the throughput generated by a bottleneck. For example, it can be useful to measure the throughput generated by a customer order for each hour that is spent at a bottleneck to make what is sold. This measurement enables management to identify, and therefore attempt to generate, more business that produces high throughput per bottleneck hour and less business that yields low throughput per bottleneck hour. The throughput per hour at a resource can be identified by the "Actual Throughput by Resource" inquiry 24 and the "Expected Throughput by Resource" 25 inquiry tools.

The Actual and Expected Throughput by Resource Inquiries are used to help manufacturing facility management determine which jobs or customer orders they should try to sell more of to increase throughput. If certain parts, or certain types of parts use the facility's resources in such a way as to be high throughput work, it makes sense for the management to try to get more of that work, by offering incentives to a sales force, or by offering sales price incentives to customers. If management can identify items that do not use an identified bottleneck, these items can be sold profitably at any net price above material and outside service cost. If the item can be made without increasing operating expense by making use of capacity that would otherwise sit idle, the entire throughput value of such additional sales goes directly to the bottom line.

Referring to FIG. 26, an actual throughput by resource inquiry identifies work orders that have yielded the greatest throughput for the time spent at a resource. If the resource selected is a bottleneck, this information can identify the types of work orders that would most increase company profit if more of them could be sold. The actual throughput by resource inquiry prompts for the resource identifier of the resource and a starting and ending date range. The actual throughput by resource inquiry determines the throughput value of each shipment made during the date range and computes the total amount of time reported at the named resource for the work order that was the source of the material and service cost data distributed to the shipment. Based on this data, a value for "throughput dollars per resource hour" is computed when in the "work orders using this resource" mode. When in "work orders NOT using this resource" mode, if a work order did not use the resource at all, then its entire throughput value is shown.

The data is sorted by throughput dollars per bottleneck hour or by throughput value, depending on mode of operation, and is displayed in a table. In one embodiment, the table window allows re-sizable columns. The data of the table of FIG. 26 is shown in FIG. 27. These elements include a customer order identifier, customer name, packlist identifier from the shipper, packlist line number, shipped date from the shipper, part identifier on the customer order line, part description for the part on the customer order line, work order quantity, sales amount (allocated quantity multiplied by unit price, less discounts and commissions), material cost (from work order or inventory multiplied by quantity allocated), service cost (from work order or inventory multiplied by quantity allocated), throughput value, hours at resource, throughput amount, and the ratio of throughput per hour.

Referring to FIG. 29, an expected throughput by resource inquiry predicts work orders that are expected to yield the greatest throughput for the time spent at a resource. If the resource selected is a bottleneck, this information can identify the types of work orders that would most increase company profit if more of them could be sold. The expected throughput by resource inquiry is somewhat similar to the actual throughput by resource inquiry, but It predicts future throughput rather than actual (past) throughput.

In one embodiment, the expected throughput by resource inquiry prompts for the resource identifier of the resource and a starting and ending date range. The expected throughput by resource inquiry determines the expected throughput value of each work order that is allocated to released customer orders and computes the total amount of time required at the selected resource for each work order that is firmed or released. The projected material and service costs on the work order are used to determine throughput. The expected sales value of a work order is found by tracing the soft allocations for the work order and multiplying the allocated quantity by the unit price on the customer order line, less discounts and commissions. The throughput value for the work order is the total net sales amount of all allocations less the estimated or projected material and service cost for the work order. Based on this data, a value for "throughput dollars per resource hour" is determined. If a work order does not use the resource at all, then its entire throughout value is shown.

The data is sorted by "throughput dollars per bottleneck hour" or throughput value, depending on mode of operation, and is listed in a table with re-sizable columns. In one embodiment, the data of the table of FIG. 28 are shown in the table of FIG. 29. These elements include a work order identifier, customer identifier, customer name, part identifier on the customer order line, part description for the part on the customer order line, soft allocation quantity that was determined by the soft allocations, work order quantity, sales amount (allocated quantity multiplied by the unit price less discounts and commissions), material cost (from work order or inventory multiplied by quantity allocated), service cost (from work order or inventory multiplied by quantity allocated), throughput value, hours at resource, and throughput per hour.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A computerized method for identifying the contention severity of a resource, comprising:
    (a) identifying a first staff/date time to assign a first task to a resource;
    (b) determining whether the resource is already allocated at the first date/time;
    (c) determining a second date/time at which the resource is available if the resource is already allocated at the first date/time;
    (d) determining the time difference between the first date/time and the second date/time as the contention severity for the first task;
    (e) repeating steps (a) through (d), substituting a second task for the first task; and
    (f) determining a total contention severity for the resource by summing the contention severity for each of the tasks scheduled to use that resource;
        wherein, if:
            (i) the resource is already allocated at the first date/time; and
            (ii) a second date/time at which the resource is available is determined; then further comprising:
            incrementing by one a contention counter for the resource;
            repeating inquiry steps (i) and (ii) for each task assigned to the resource, incrementing by one the contention counter for the resource if inquiry steps (i) and (ii) are satisfied, thereby generating a total contention count for the resource;
            evaluating a total contention count for a plurality of resources; and
            generating promotions or sales incentives to solicit work orders not involving resources with a total contention count above a predetermined threshold.

2. The method of claim 1, wherein the first and second tasks are associated with a first work order and a second work order, respectively.

3. The method of claim 1, wherein the resource is a first resource, the method further comprising repeating steps (a) through (f), substituting a second resource for the first resource.

4. The method of claim 3, further comprising displaying the total contention severity for the first resource and the total contention severity for the second resource.

5. The method of claim 3, further comprising:
    evaluating the total contention severity for a plurality of resources; and
    generating promotions or sales incentives to solicit work orders not involving resources with a total contention severity above a predetermined threshold.

6. The method of claim 1, further comprising:
    storing the determined contention severity for each task in a storage device; and
    retrieving the stored contention severity.

7. The method of claim 1, further comprising:
    storing the determined total contention severity for the resource in a storage device; and
    retrieving the stored total contention severity.

8. The method of claim 1, wherein the second date/time is earlier in time than the first date/time.

9. The method of claim 1, wherein a contention severity for a task is not included in the summing of the contention severity for each of the tasks to determine the total contention severity for the resource if the second date/time for the respective task is earlier in time than the first date/time.

10. A computerized method for identifying contention severity of a material, comprising:
    (a) identifying a first date/time to assign a first requirement for the material;
    (b) determining whether the material is already allocated at the first date/time;
    (c) determining a second date/time at which the material is available if the material is already allocated at the first date/time;
    (d) determining the time difference between the first date/time and the second date/time as the contention severity of the first requirement for the material;
    (e) repeating steps (a) through (d), substituting a second requirement for the material for the first requirement for the material; and
    (f) determining a total contention severity for the material by summing the contention severity of each of the requirements for the material;
        wherein, if:
            (i) the resource is already allocated at the first date/time; and
            (ii) a second date/time at which the resource is available is determined; then further comprising:
            incrementing by one a contention counter for the resource;
            repeating inquiry steps (i) and (ii) for each task assigned to the resource, incrementing by one the contention counter for the resource if inquiry steps (i) and (ii) are satisfied, thereby generating a total contention count for the resource;
            evaluating a total contention count for a plurality of resources; and
            generating promotions or sales incentives to solicit work orders not involving resources with a total contention count above a predetermined threshold.

11. The method of claim 10, wherein the first and second requirements are associated with a first work order and a second work order, respectively.

12. The method of claim 10, wherein the material is a first material, the method further comprising repeating steps (a) through (f), substituting a second material for the first material.

13. The method of claim 12, further comprising displaying the total contention severity for the first material and the total contention for the second material.

14. The method of claim 12, further comprising:
    evaluating the total contention severity for a plurality of materials; and
    generating promotions or sales incentives to solicit work orders not involving materials with a total contention severity above a predetermined threshold.

15. The method of claim 10, further comprising:
    storing the determined contention severity for each requirement in a storage device; and
    retrieving the stored contention severity.

16. The method of claim 10, further comprising:
    storing the determined total contention severity for the material in a storage device; and
    retrieving the stored total contention severity.

17. The method of claim 10, wherein the second date/time is earlier in time than the first date/time.

18. The method of claim 10, wherein a contention severity for a task is not included in the summing of the contention severity for each of the tasks to determine the total contention severity for the material if the second date/time for the respective task is earlier in time than the first date/time.

* * * * *